US012634596B2

(12) United States Patent (10) Patent No.: US 12,634,596 B2
Kodama (45) Date of Patent: May 19, 2026

(54) SENSOR APPARATUS

(71) Applicant: SONY SEMICONDUCTOR SOLUTIONS CORPORATION, Kanagawa (JP)

(72) Inventor: Kazutoshi Kodama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 94 days.

(21) Appl. No.: 18/694,712

(22) PCT Filed: Jul. 4, 2022

(86) PCT No.: PCT/JP2022/026560
§ 371 (c)(1),
(2) Date: Mar. 22, 2024

(87) PCT Pub. No.: WO2023/058283
PCT Pub. Date: Apr. 13, 2023

(65) Prior Publication Data
US 2024/0397220 A1 Nov. 28, 2024

(30) Foreign Application Priority Data
Oct. 6, 2021 (JP) ................................. 2021-164911

(51) Int. Cl.
*H04N 25/47* (2023.01)
*H04N 25/78* (2023.01)
(52) U.S. Cl.
CPC ............. *H04N 25/47* (2023.01); *H04N 25/78* (2023.01)

(58) Field of Classification Search
None
See application file for complete search history.

(56) References Cited

U.S. PATENT DOCUMENTS

2016/0131772 A1* 5/2016 Sato ....................... H04N 25/57
378/62

FOREIGN PATENT DOCUMENTS

JP 2019-092155 A 6/2019
JP 2020-068522 A 4/2020
(Continued)

OTHER PUBLICATIONS

International Search Report and Written Opinion of PCT Application No. PCT/JP2022/026560, issued on Sep. 13, 2022, 09 pages of ISRWO.

*Primary Examiner* — Mark T Monk
(74) *Attorney, Agent, or Firm* — CHIP LAW GROUP

(57) ABSTRACT
Provided is a sensor apparatus that includes a pixel array, a control circuit, a read circuit, and a signal processing circuit. In the pixel array, a plurality of pixels each having a detection element for detecting an event are arranged in at least a plurality of columns and at least one line constituting an array pattern. The control circuit controls scanning of the pixels in units of frames. The read circuit reads an event detected by the detection element with a timing controlled by the control circuit. The signal processing circuit processes and outputs a signal read by the read circuit. In the sensor apparatus, with the plurality of columns divided into groups at least one of which includes a plurality of columns, the control circuit controls the group to be accessed, and the read circuit acquires the signal from the pixel accessed by the control circuit.

20 Claims, 37 Drawing Sheets

(56)  References Cited

FOREIGN PATENT DOCUMENTS

| WO | 2021/014921 | A1 | 1/2021 |
| WO | 2021/153254 | A1 | 8/2021 |

* cited by examiner

F I G . 1
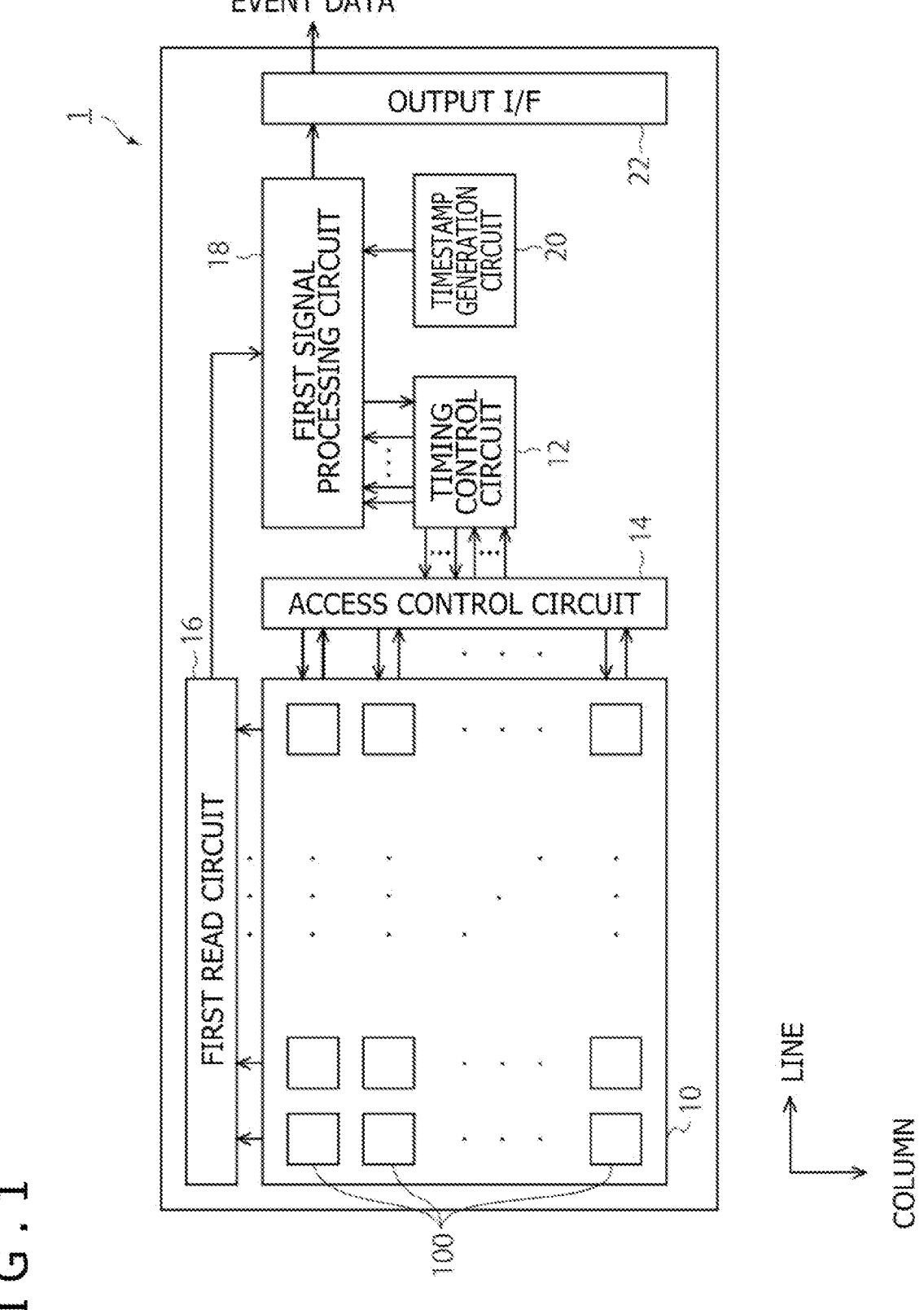

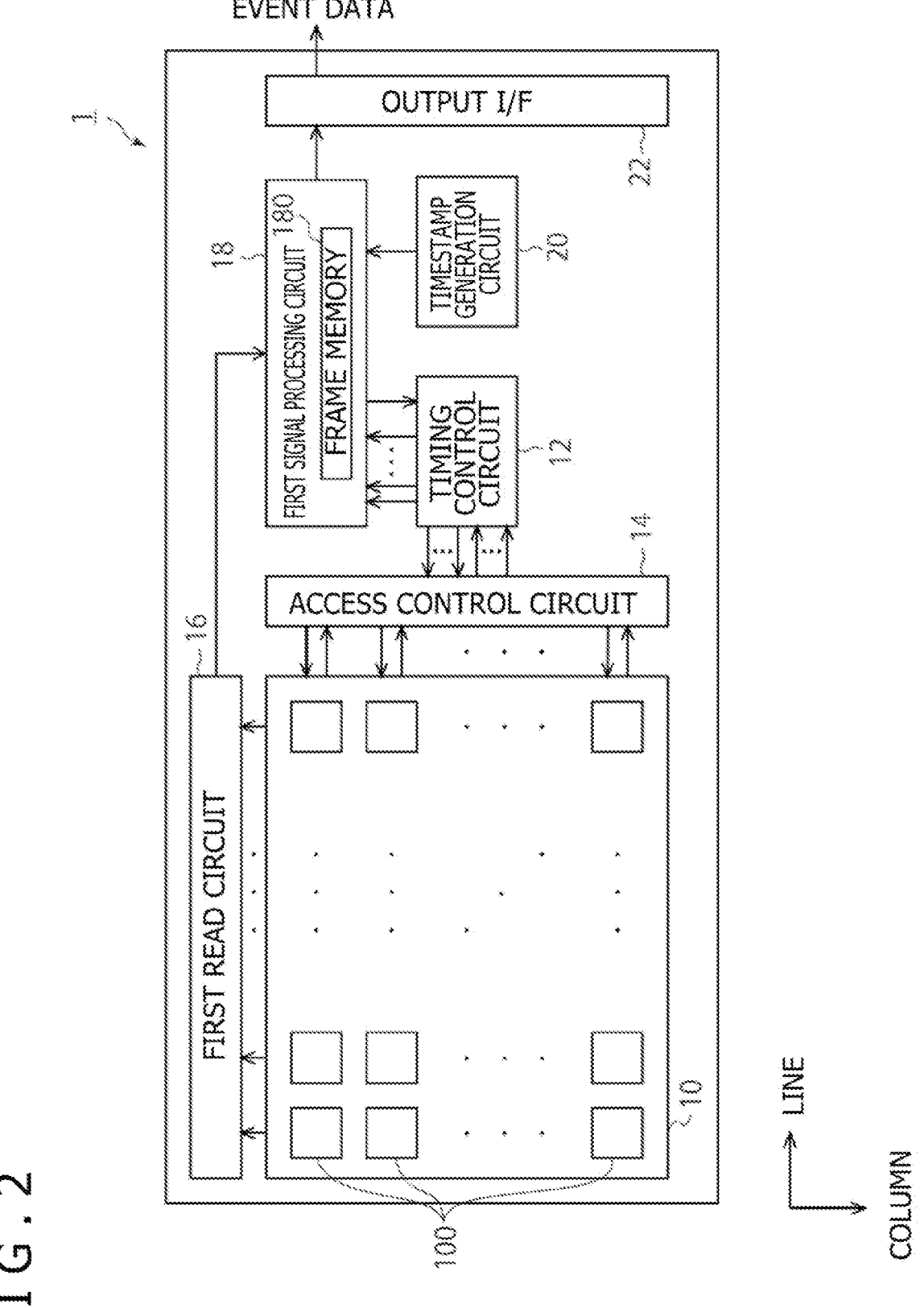
F I G . 2

EVENT DATA     GRADATION DATA

F I G . 4
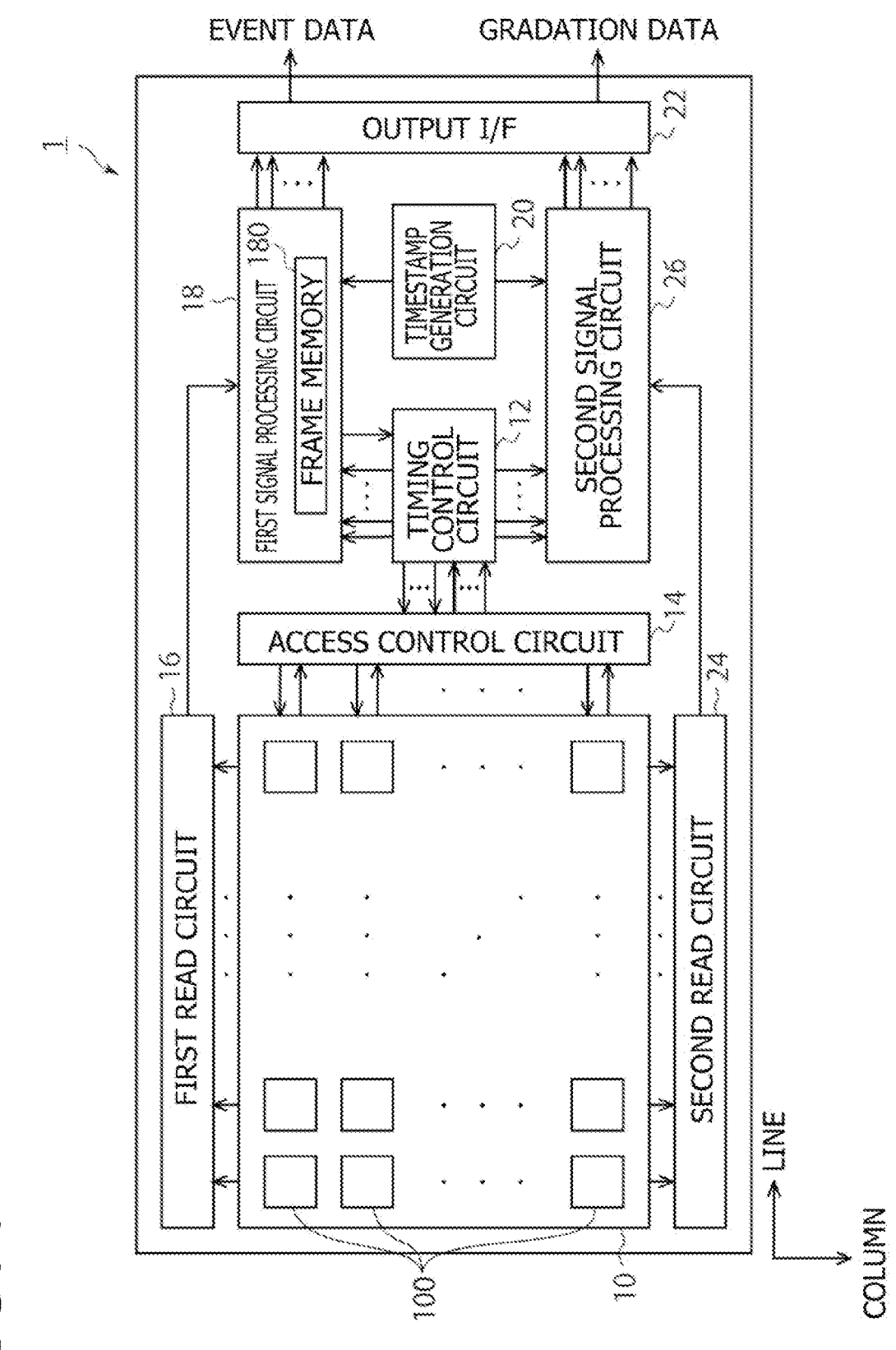

F I G . 5

FIG.6
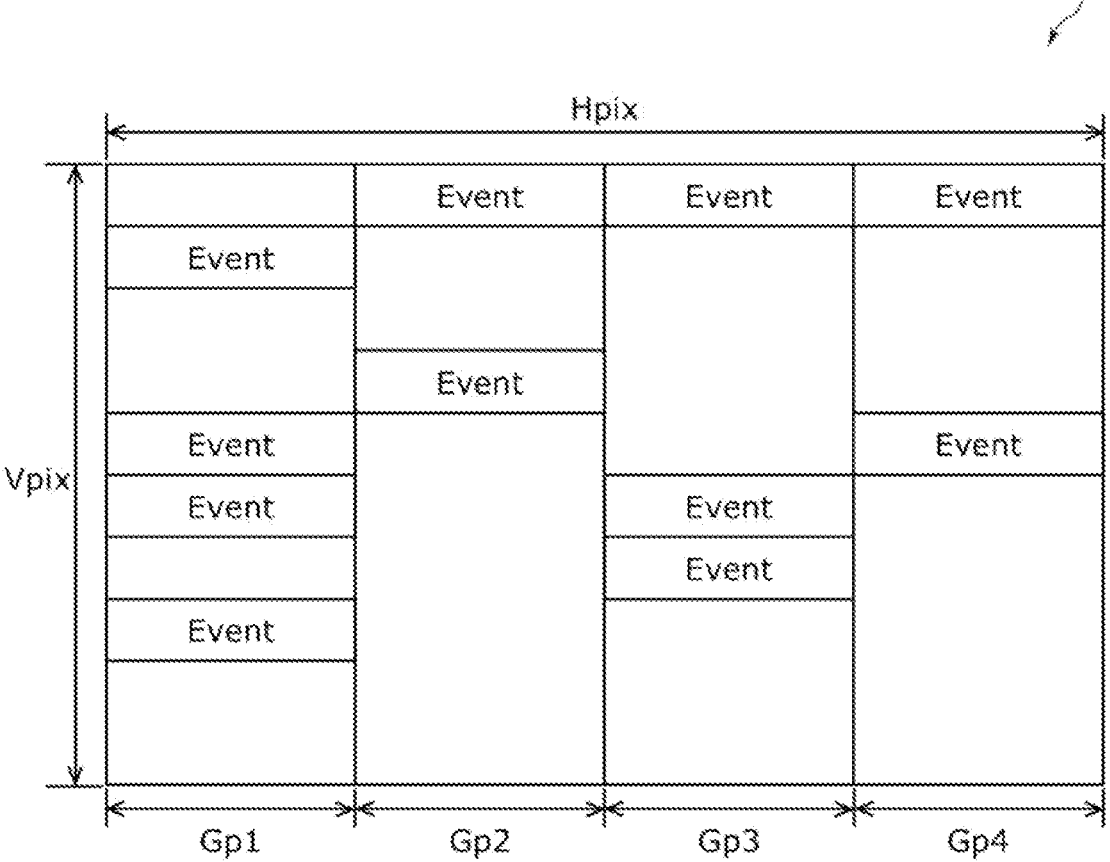
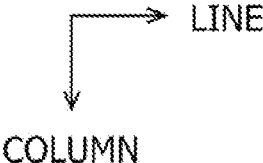

F I G . 7
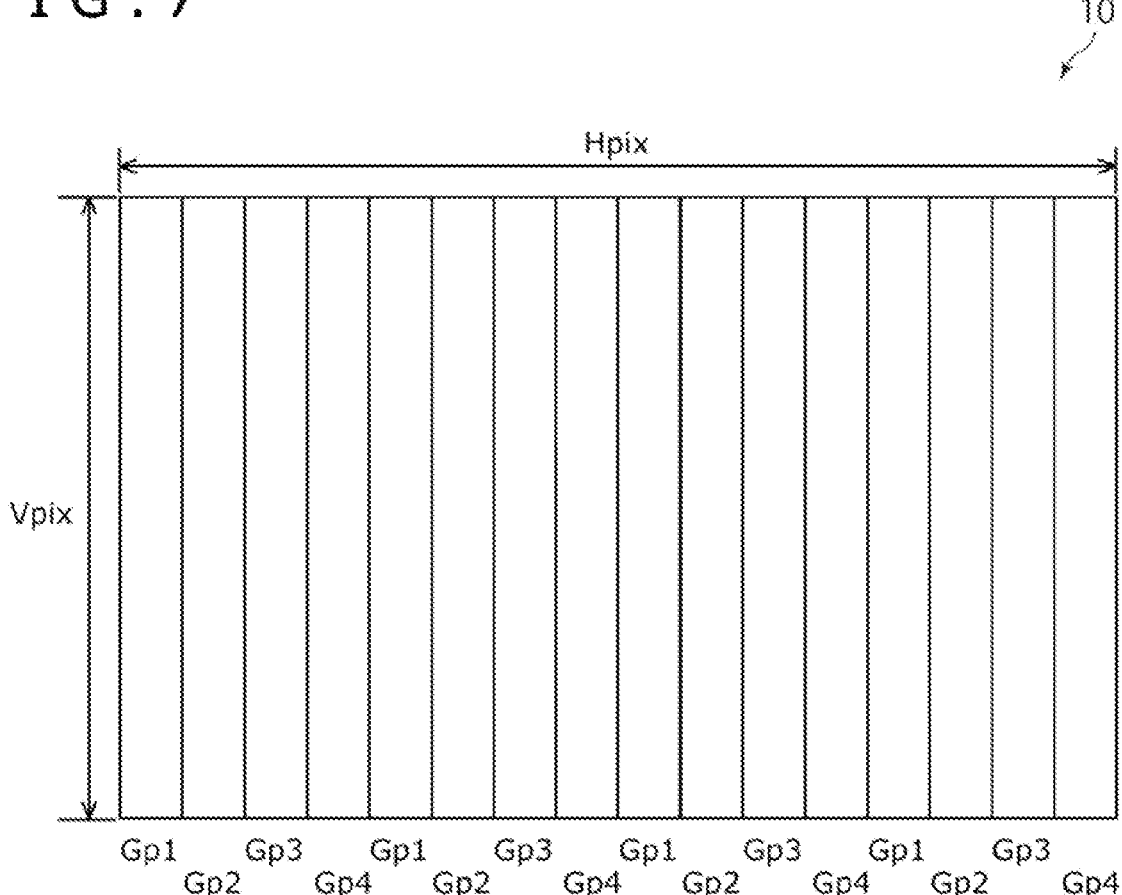
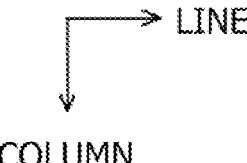

FIG.8
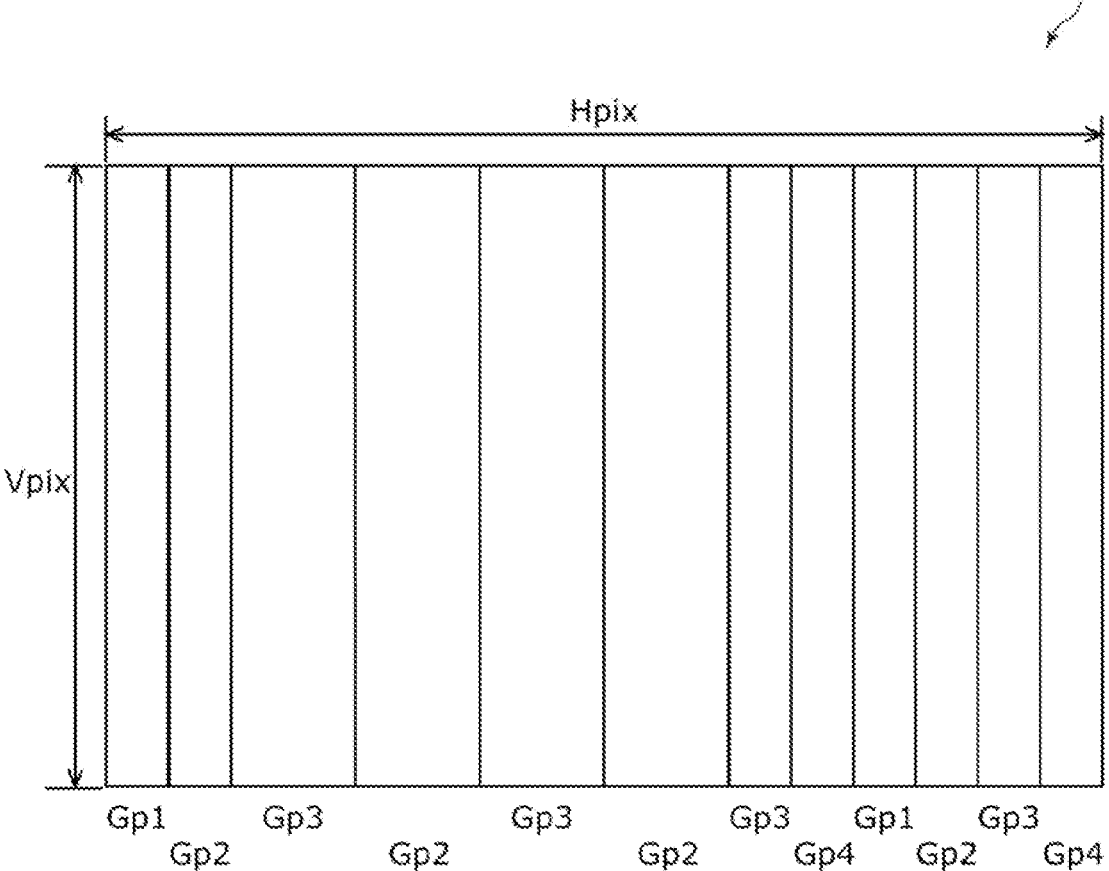
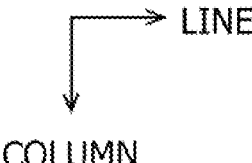

FIG.11
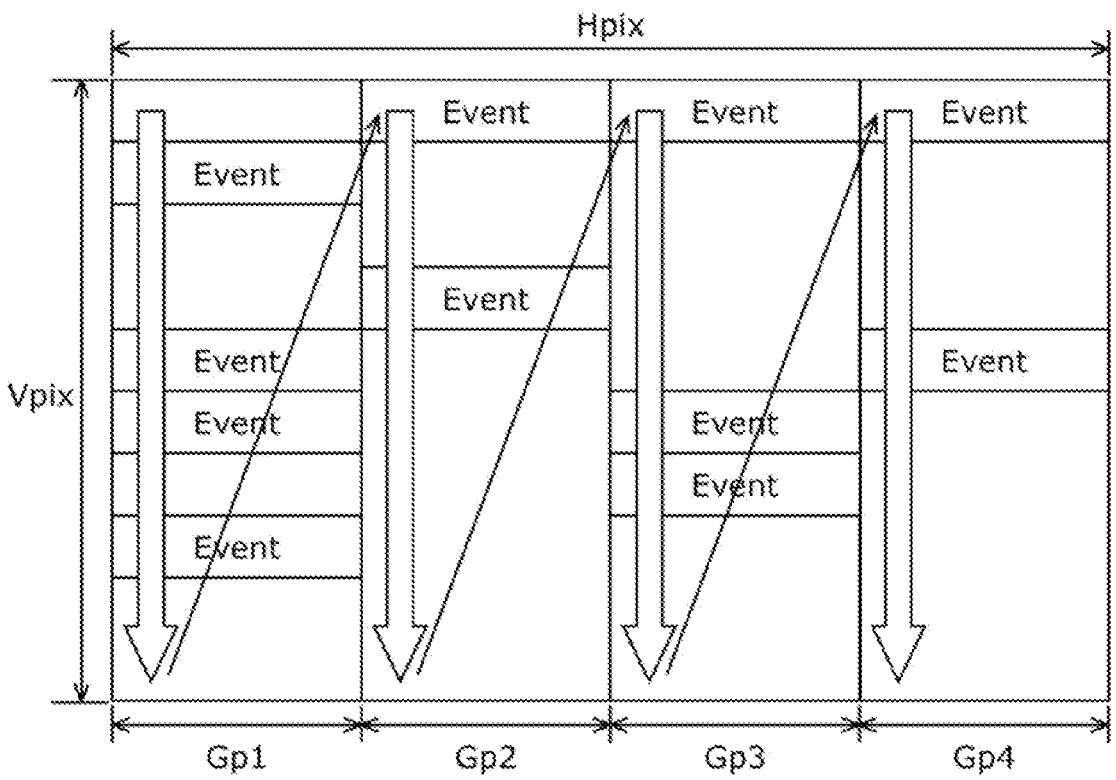
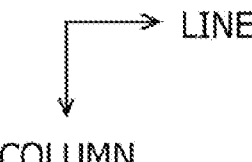
LINE
COLUMN

F I G . 1 2

FIG.13

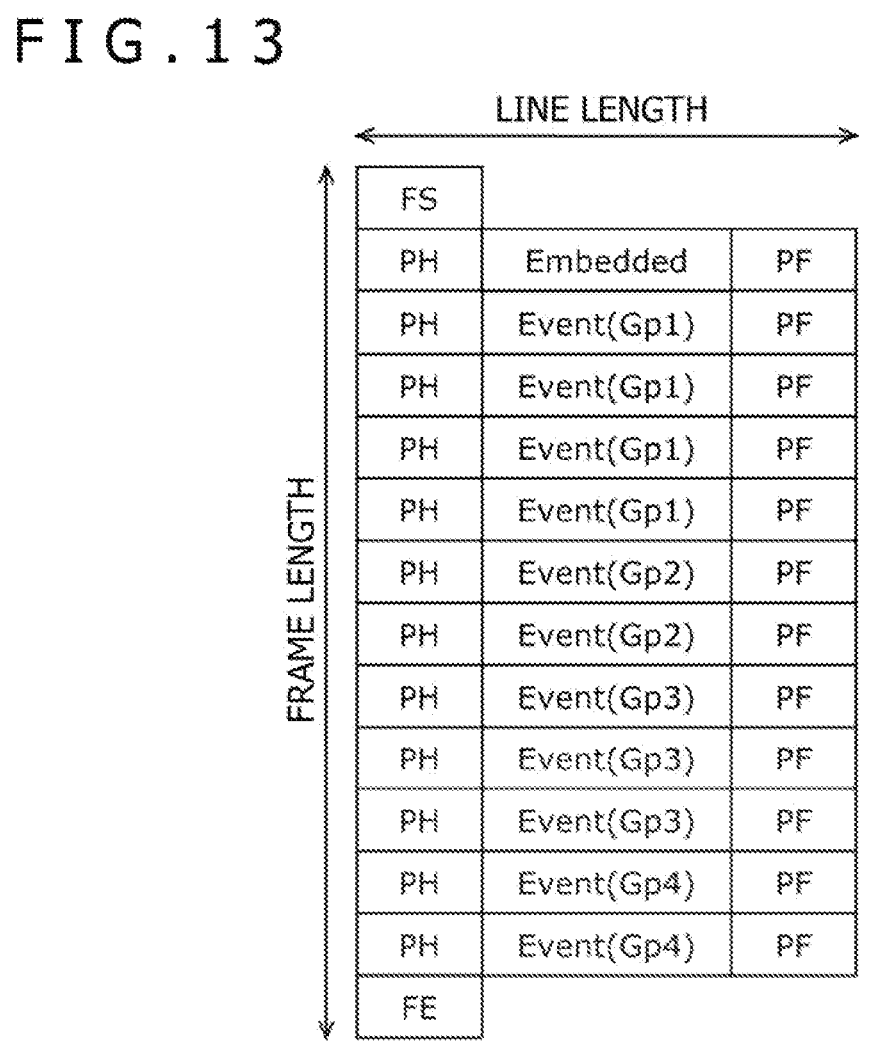

LINE LENGTH

| FS | | |
|----|---------------|----|
| PH | Embedded | PF |
| PH | Event(Gp1) | PF |
| PH | Event(Gp1) | PF |
| PH | Event(Gp1) | PF |
| PH | Event(Gp1) | PF |
| PH | Event(Gp2) | PF |
| PH | Event(Gp2) | PF |
| PH | Event(Gp3) | PF |
| PH | Event(Gp3) | PF |
| PH | Event(Gp3) | PF |
| PH | Event(Gp4) | PF |
| PH | Event(Gp4) | PF |
| FE | | |

FRAME LENGTH

FIG.14

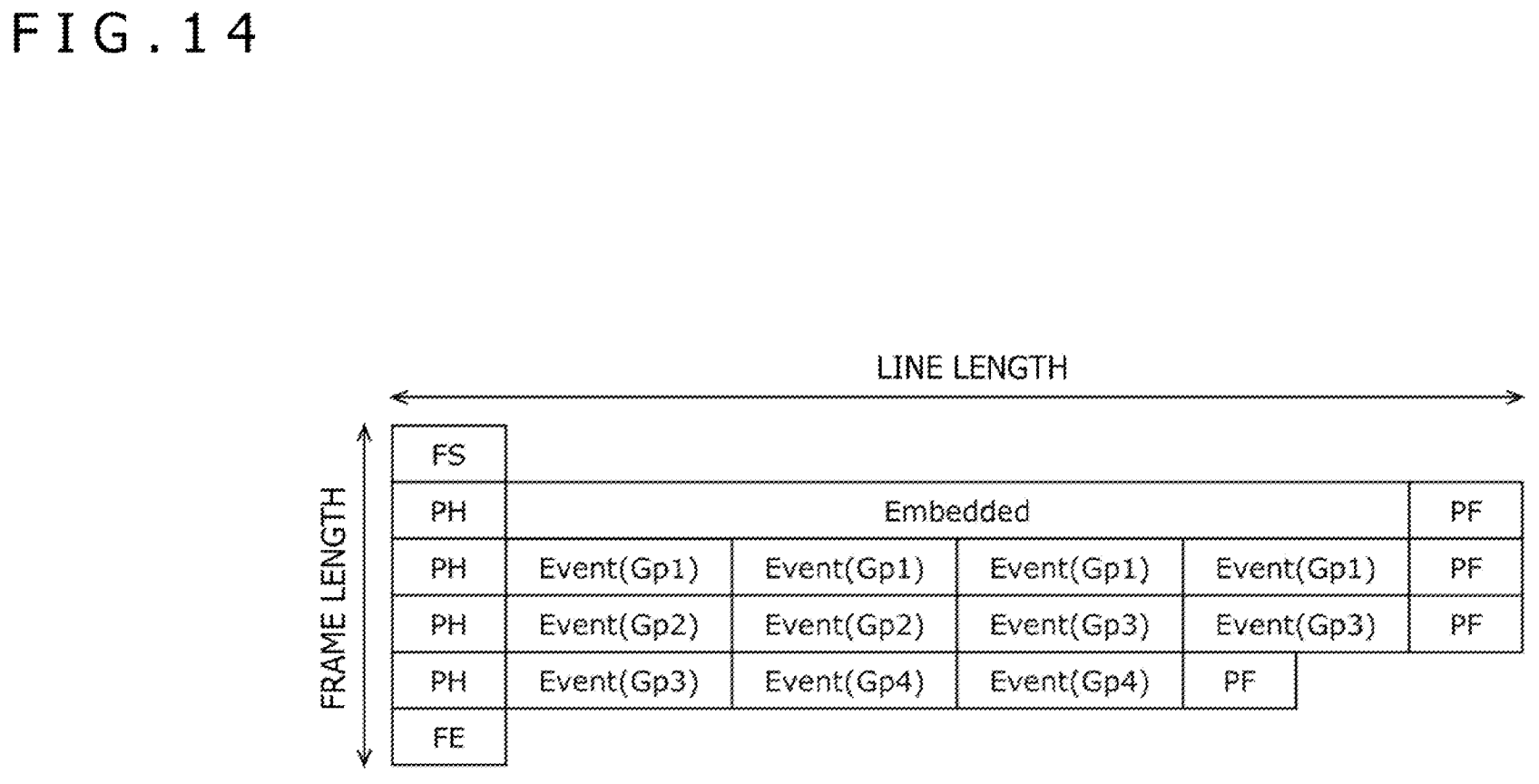

| | LINE LENGTH | | | |
|---|---|---|---|---|
| FS | | | | |
| PH | Event(Gp1) | Event(Gp1) | Event(Gp1) | PF |
| PH | Event(Gp2) | Event(Gp2) | Event(Gp3) | PF |
| PH | Event(Gp3) | Event(Gp4) | Event(Gp3) | PF |
| PH | | Event(Gp4) | PF | |
| FE | | | | |

Embedded

FRAME LENGTH

Figure 1:
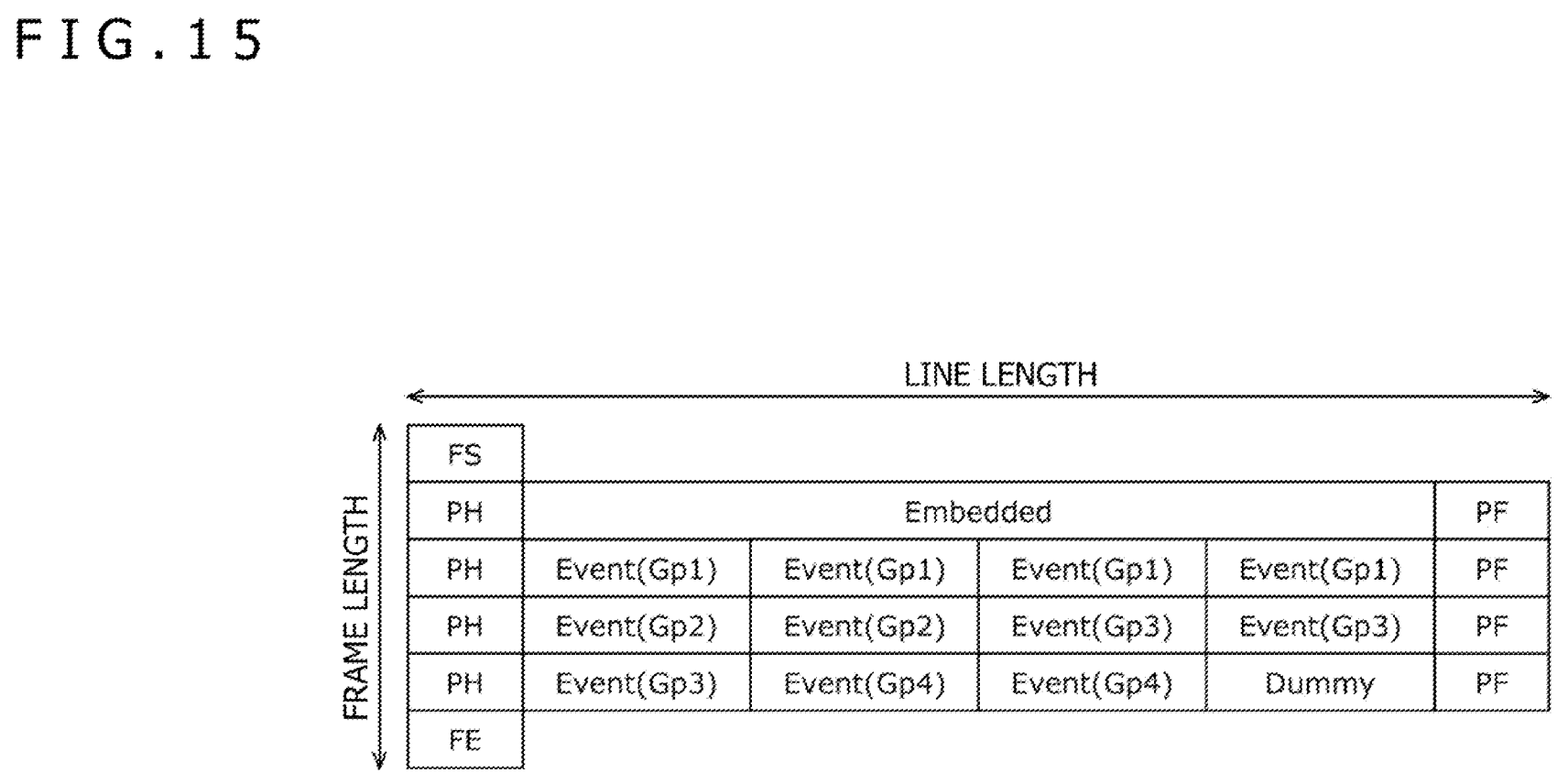

F I G . 1 5

| | | Embedded | | | |
|---|---|---|---|---|---|
| FS | | | | | |
| PH | | | | | PF |
| PH | Event(Gp1) | Event(Gp1) | Event(Gp1) | PF |
| PH | Event(Gp2) | Event(Gp2) | Event(Gp3) | PF |
| PH | Event(Gp3) | Event(Gp4) | Event(Gp4) | Dummy | PF |
| FE | | | | | |

LINE LENGTH

FRAME LENGTH

FIG.16
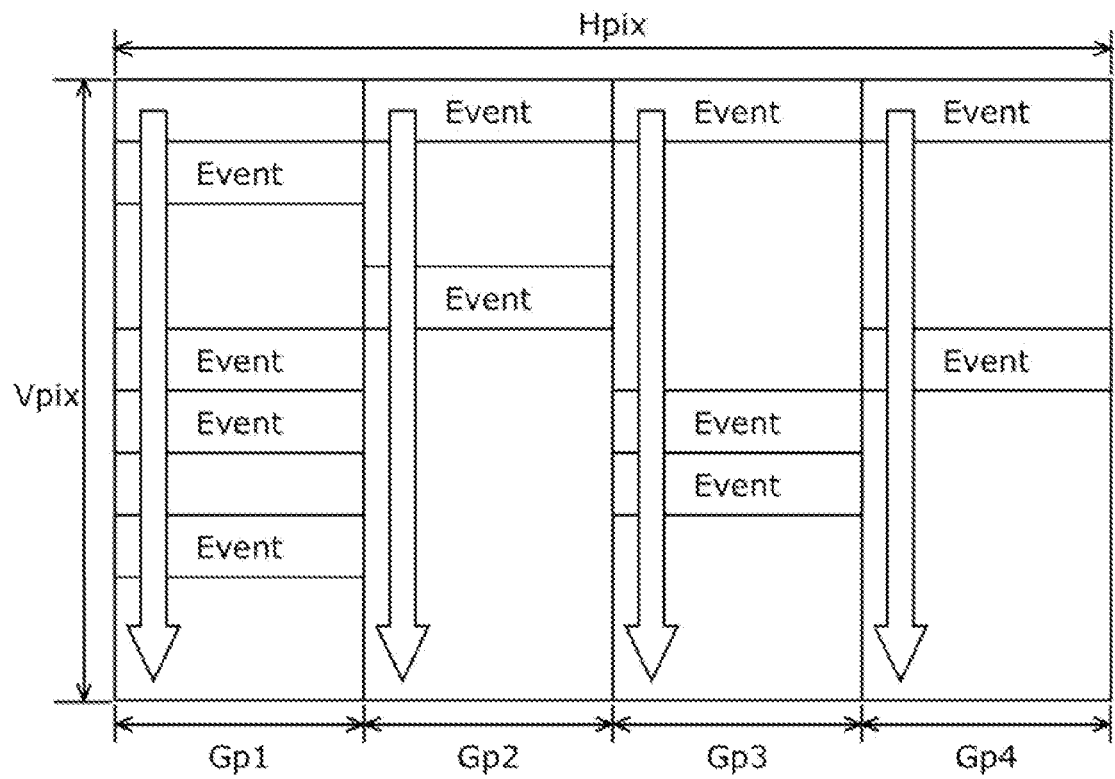
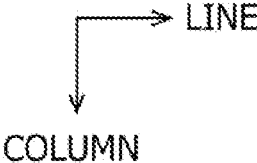

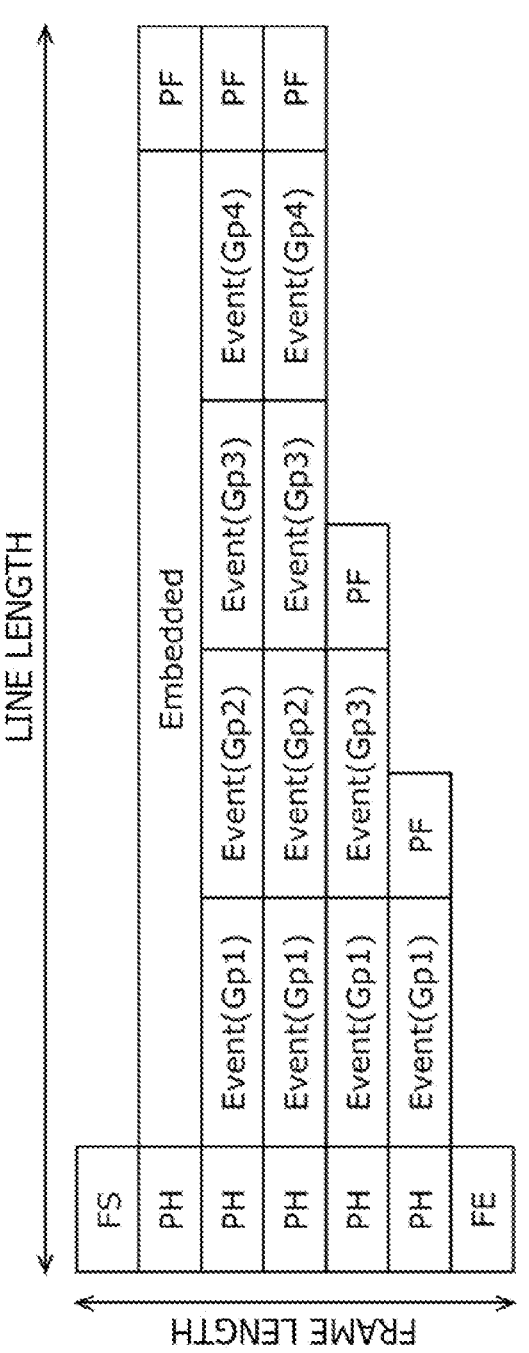
F I G . 1 9

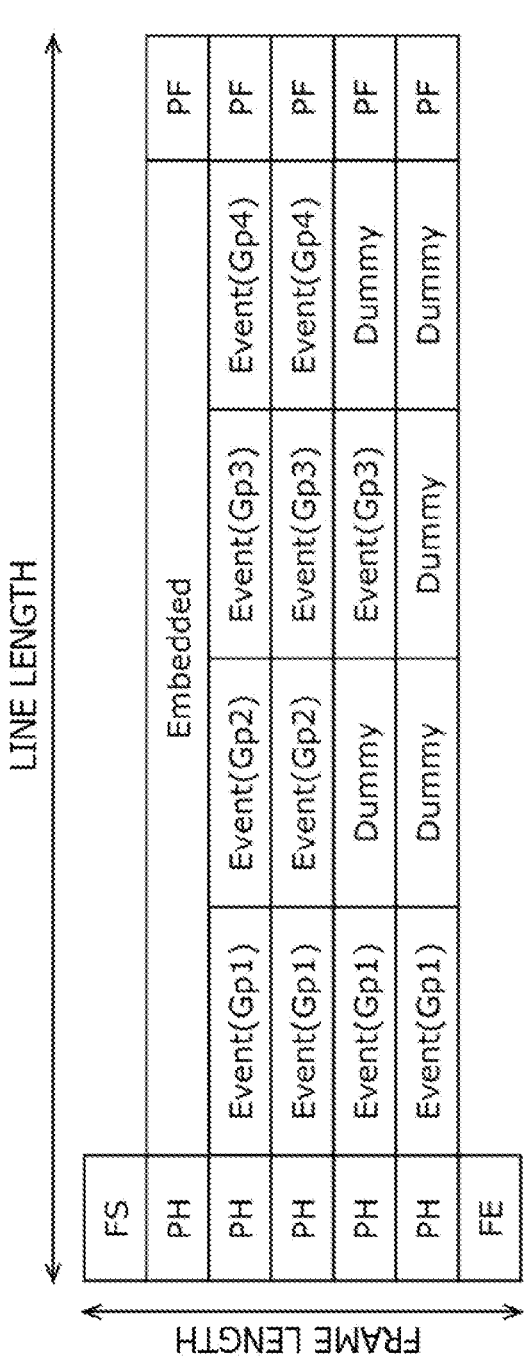
F I G . 2 0

Figure 2:
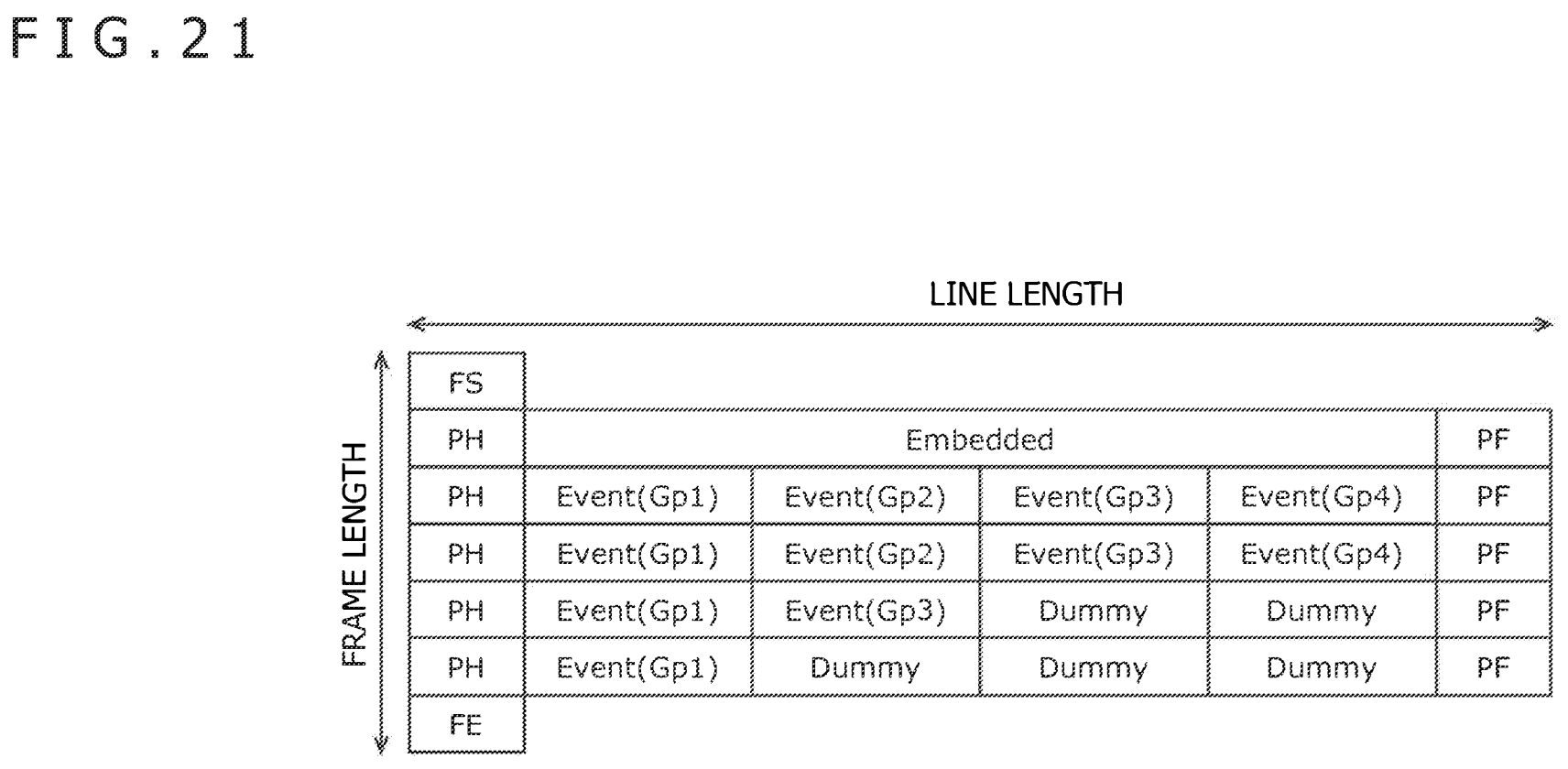

F I G . 2 1

| FS | Embedded | | | |
|---|---|---|---|---|
| PH | | | | PF |
| PH | Event(Gp1) | Event(Gp2) | Event(Gp3) | Event(Gp4) | PF |
| PH | Event(Gp1) | Event(Gp2) | Event(Gp3) | Event(Gp4) | PF |
| PH | Event(Gp1) | Event(Gp3) | Dummy | Dummy | PF |
| PH | Event(Gp1) | Dummy | Dummy | Dummy | PF |
| FE | | | | |

LINE LENGTH

FRAME LENGTH

F I G . 2 2
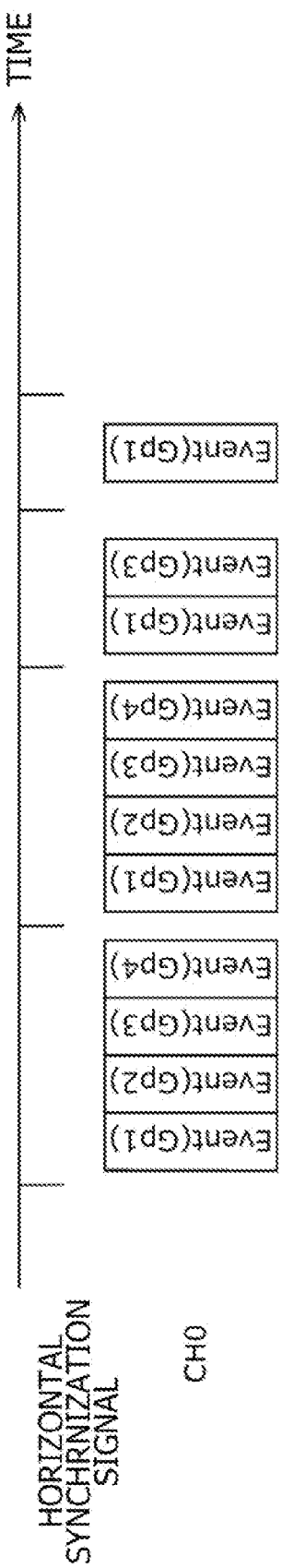

F I G . 2 4
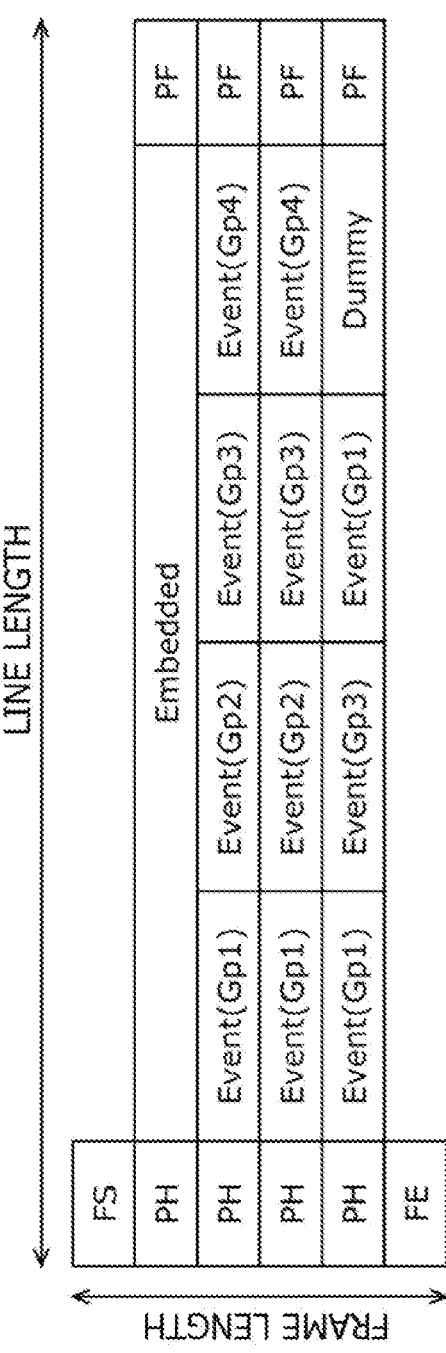

F I G . 2 6
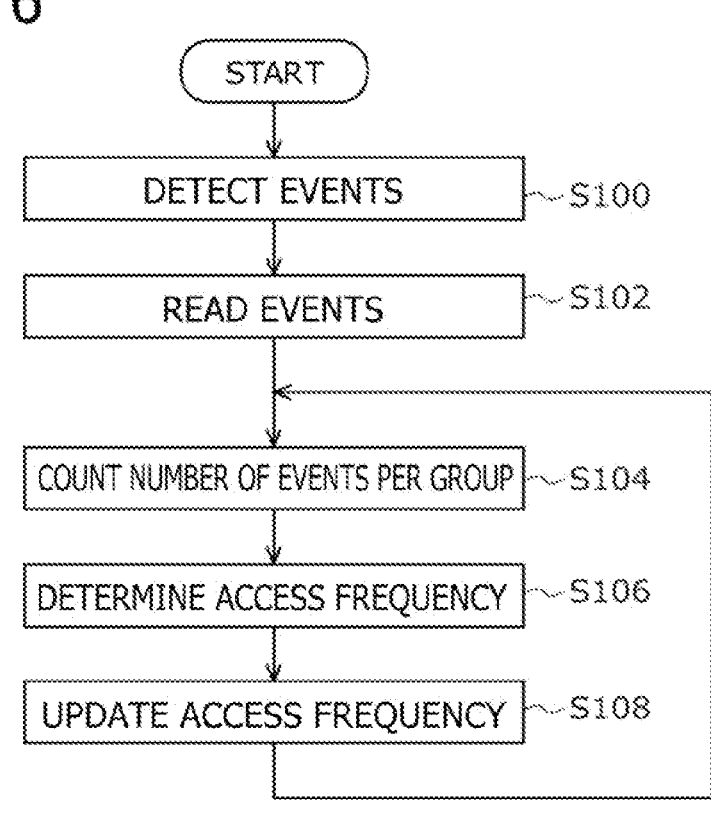

F I G . 2 9
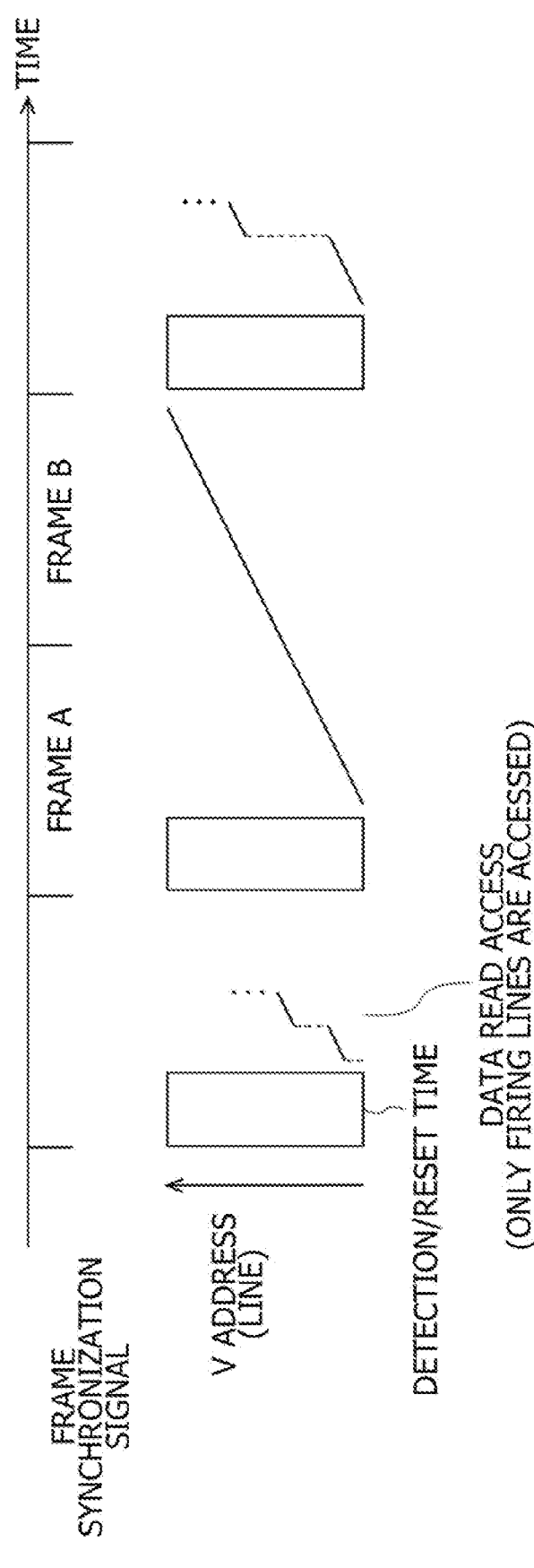

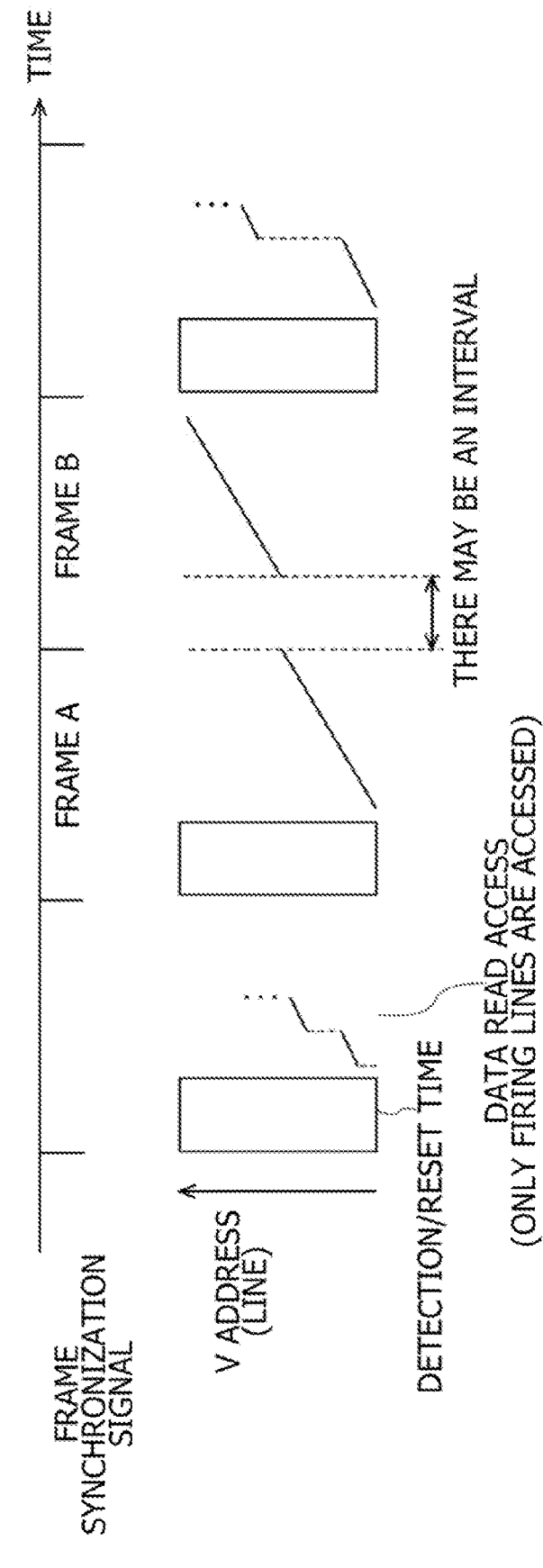
F I G . 3 0

F I G . 3 2
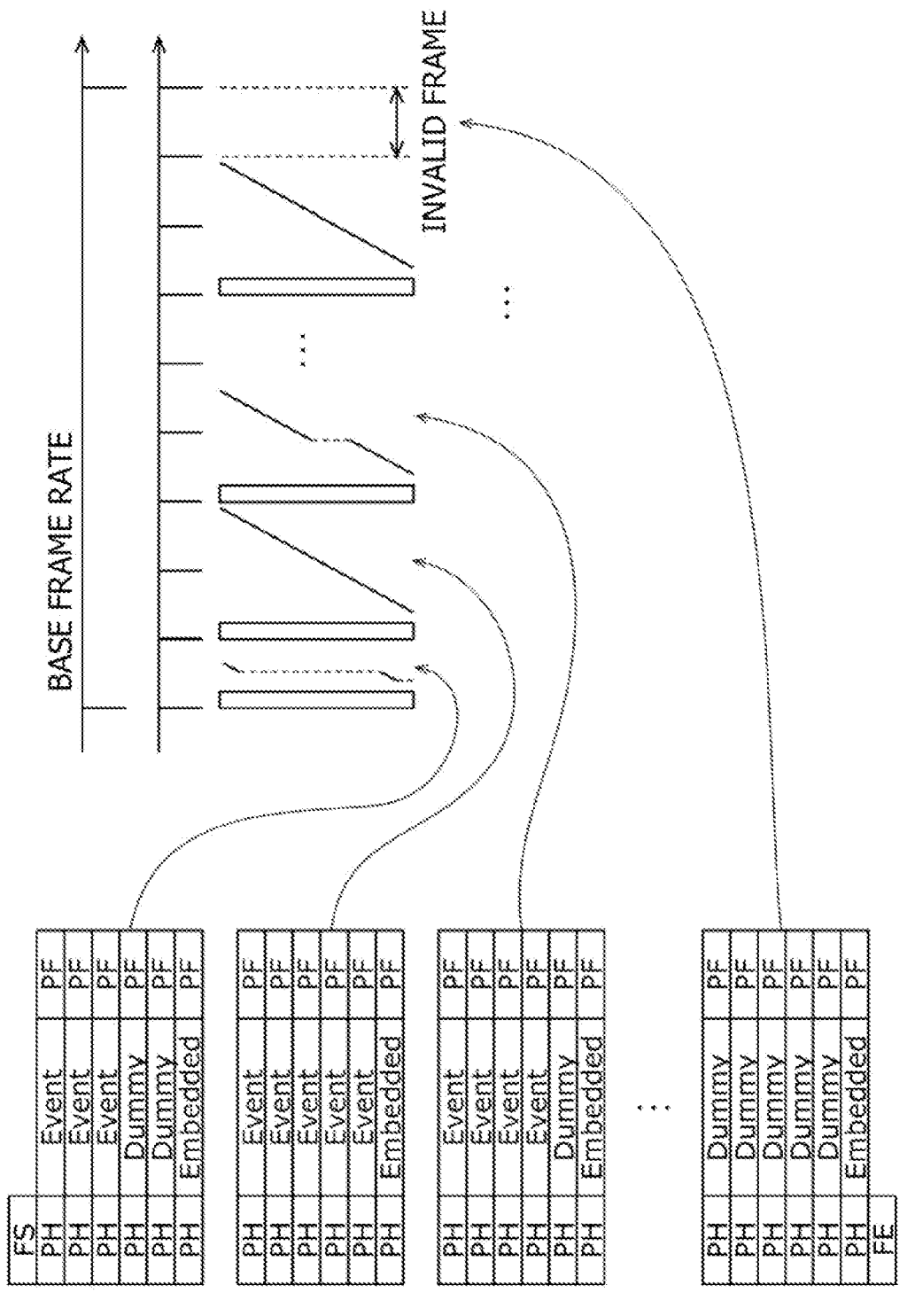

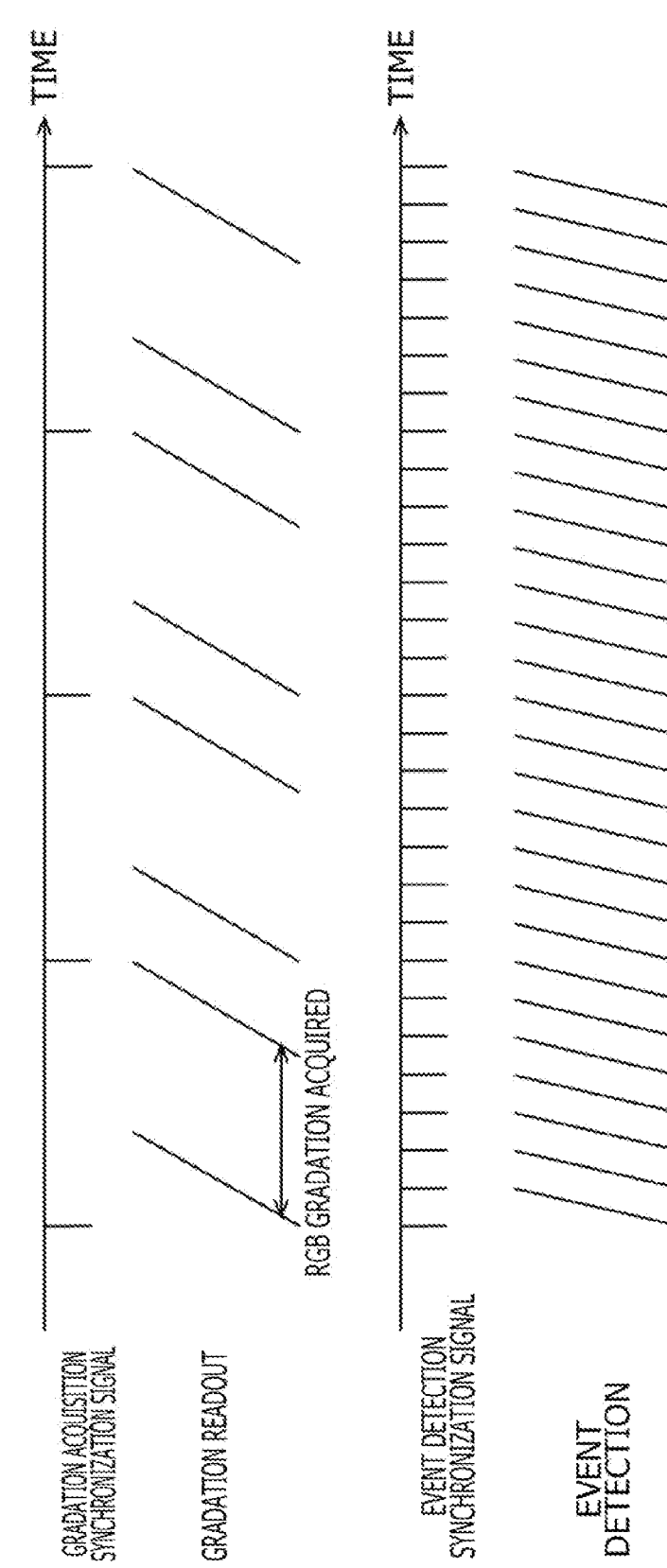
F I G . 3 3

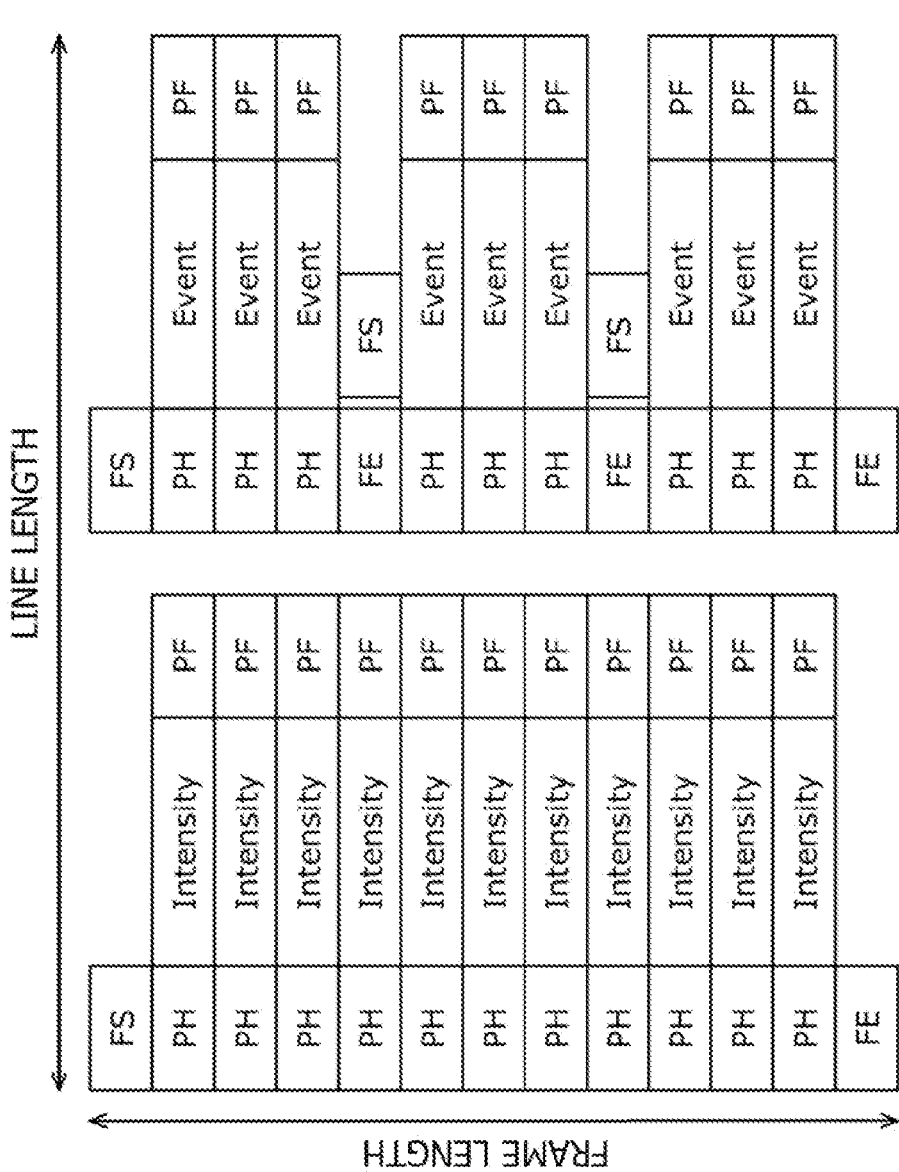
F I G . 3 4

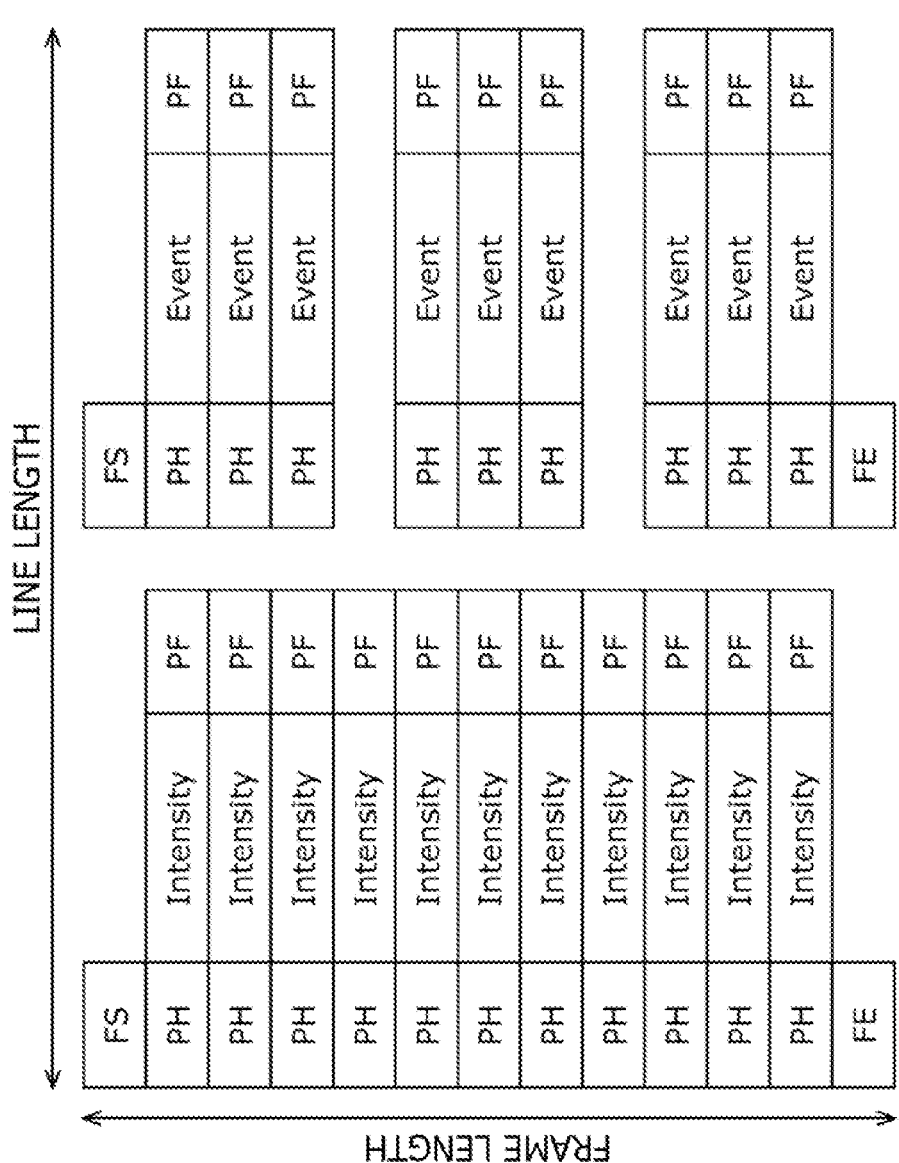
F I G . 3 5

FIG.36

LINE LENGTH

| FS | | | |
|----|-----------|-------|----|
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | PF | |
| PH | Intensity | PF | |
| FE | | | |

FRAME LENGTH

FIG.37

LINE LENGTH

| FS | | | |
|----|----|----|----|
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Event | PF |
| PH | Intensity | Dummy | PF |
| PH | Intensity | Dummy | PF |
| FE | | | |

FRAME LENGTH

1

SENSOR APPARATUS

CROSS REFERENCE TO RELATED APPLICATIONS

This application is a U.S. National Phase of International Patent Application No. PCT/JP2022/026560 filed on Jul. 4, 2022, which claims priority benefit of Japanese Patent Application No. JP 2021-164911 filed in the Japan Patent Office on Oct. 6, 2021. Each of the above-referenced applications is hereby incorporated herein by reference in its entirety.

TECHNICAL FIELD

The present disclosure relates to a sensor apparatus.

BACKGROUND ART

There are known methods for detecting an object by use of an imaging apparatus having a pixel array in which imaging pixels each including an imaging element are arranged in the form of an array. The pixel array captures an image and transmits an image signal representing the captured image to a processor external to an array sensor so that the processor will perform suitable signal processing for object detection. Using such an image sensor for detecting objects involves transmitting information regarding the captured image to the external processor for object detection regardless of the targets being imaged, the processor carrying out calculation processes to detect the objects.

The processes above are dependent to a certain extent on the processing capacity of general-purpose processors. Efficient methods have yet to be proposed to allow the processor to operate at a frame rate limited to a predetermined target label. This has resulted in a calculation overload on the side of the processor, entailing a delay in the processing. Although proposals have been made to have the frame rate variable in order to resolve the problem of the processing delay, they still leave the problem of having to provide a latency corresponding to frames for the process of detection.

CITATION LIST

Patent Literature

PTL 1

Japanese Patent Laid-open No. 2020-068522

PTL 2

Japanese Patent Laid-open No. 2019-092155

SUMMARY

Technical Problem

In view of the above, the present disclosure provides a sensor apparatus capable of high-speed output in response to firing of an imaging element for detecting an event.

Solution to Problem

According to one embodiment, there is provided a sensor apparatus including a pixel array having a plurality of pixels arranged in an array pattern, the pixels each including a detection element for detecting an event, the array including at least a plurality of columns and at least one line; a control circuit configured to control scanning of the pixels in units of frames; a read circuit configured to read the event detected by the detection element with a timing controlled by the control circuit; and a signal processing circuit configured to process and output a signal read by the read circuit. With the plurality of columns divided into groups at least one of which includes a plurality of the columns, the control circuit controls the group to be accessed. The read circuit acquires the signal from the pixel accessed by the control circuit.

The group may include at least a plurality of the columns that are adjacent.

The group may include at least a plurality of the columns that are not adjacent.

The control circuit may perform control to access the line firing in the group.

The control circuit may perform control parallelly to access a plurality of groups.

A synchronization signal for accessing to and performing read control of the pixels and a synchronization signal for controlling processing of the read signal may have the same fixed periodicity.

The synchronization signal for accessing to and performing the read control of the pixels and the synchronization signal for controlling processing of the read signal may each have a variable periodicity.

The synchronization signal for accessing to and performing the read control of the pixels and the synchronization signal for controlling processing of the read signal may have the same periodicity.

The signal processing circuit may include a frame memory. The synchronization signal for accessing to and performing the read control of the pixels and the synchronization signal for controlling processing of the read signal may each have a different periodicity.

The control circuit may control access to the pixels belonging to each of the groups, the access being made successively from one group to another.

The control circuit may control access to each of the groups in a desired sequence starting from a desired one of the groups.

The control circuit may perform control in a manner changing a read frequency for each of the groups.

The signal processing circuit may output data in which data regarding a plurality of scan lines is arranged onto the same line.

The read circuit may read the event from the pixel array according to a frame synchronization signal across a plurality of frames.

In the case of reading the event from the pixel array according to the frame synchronization signal across the frames, the read circuit may have time not to access the pixels between the frames.

The control circuit may issue a frame synchronization signal at a timing when scanning of the pixel array is completed, thereby generating an output frame rate.

The control circuit may output event information regarding a plurality of frames using a base frame rate concatenating the plurality of the frames, the control circuit further setting a frame at the end of the base frame rate as a dummy frame.

The pixel array may acquire gradation information regarding light received by the pixels, and the pixel array may further output the acquired gradation information.

Data in a plurality of output frames may be combined and output at a fixed-length output frame rate setting an access rate to be variable.

The fixed length of the output frame rate may be set on the basis of a trigger periodicity input from the outside.

BRIEF DESCRIPTION OF DRAWINGS

FIG. 1 is a block diagram schematically depicting an example of a sensor apparatus in an embodiment.

FIG. 2 is a block diagram schematically depicting another example of the sensor apparatus in an embodiment.

FIG. 4 is a block diagram schematically depicting another example of the sensor apparatus in an embodiment.

FIG. 5 is a view schematically depicting an example of pixels of an embodiment.

FIG. 6 is a view schematically depicting an example of grouping columns in an embodiment.

FIG. 7 is a view schematically depicting another example of grouping columns in an embodiment.

FIG. 8 is a view schematically depicting another example of grouping columns in an embodiment.

FIG. 11 is a view schematically depicting an example of the sequence of reading groups in an embodiment.

FIG. 12 is a view depicting the timing of reading groups in an embodiment.

FIG. 13 is a view depicting an exemplary transfer format of an embodiment.

FIG. 14 is a view depicting another exemplary transfer format of an embodiment.

FIG. 15 is a view depicting another exemplary transfer format of an embodiment.

FIG. 16 is a view schematically depicting another example of the sequence of reading groups in an embodiment.

FIG. 19 is a view depicting another exemplary transfer format of an embodiment.

FIG. 20 is a view depicting another exemplary transfer format of an embodiment.

FIG. 21 is a view depicting another exemplary transfer format of an embodiment.

FIG. 22 is another view depicting the timing of reading groups in an embodiment.

FIG. 24 is a view depicting another exemplary transfer format of an embodiment.

FIG. 26 is a flowchart depicting an exemplary process of setting the timing of event detection and the timing of readout in an embodiment.

FIG. 29 is a view depicting an example of the timing of frame readout and the timing of pixel readout in an embodiment.

FIG. 30 is a view depicting another example of the timing of frame readout and the timing of pixel readout in an embodiment.

FIG. 32 is a view depicting another example of the timing of frame readout and the timing of pixel readout in an embodiment.

FIG. 33 is a view depicting an example of the timing of event detection information readout and the timing of gradation information readout in an embodiment.

FIG. 34 is a view depicting an exemplary format for outputting event detection information and gradation information in an embodiment.

FIG. 35 is a view depicting another exemplary format for outputting event detection information and gradation information in an embodiment.

FIG. 36 is a view depicting another exemplary format for outputting event detection information and gradation information in an embodiment.

FIG. 37 is a view depicting another exemplary format for outputting event detection information and gradation information in an embodiment.

DESCRIPTION OF EMBODIMENTS

Figure 3:
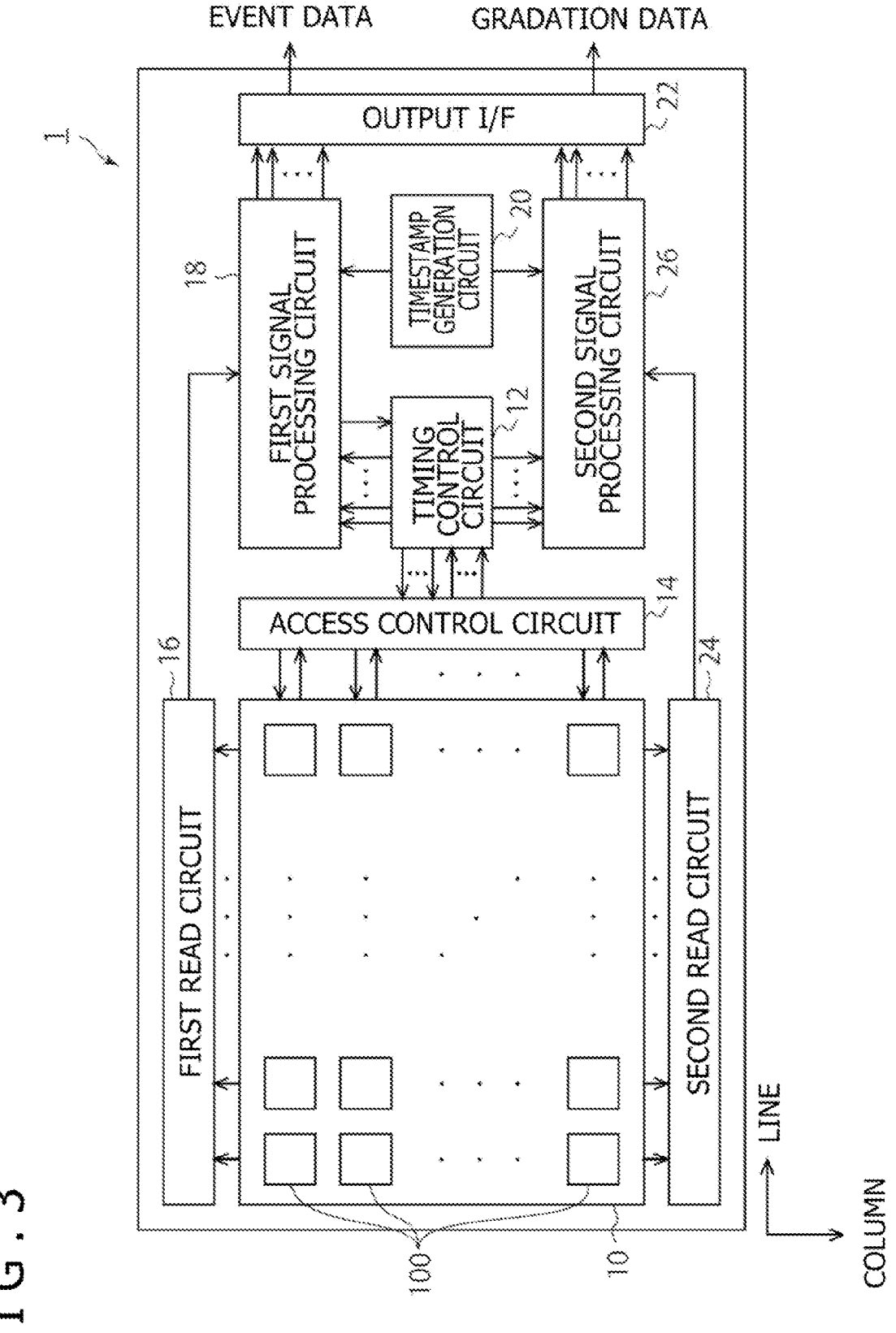
FIG. 3 is a block diagram schematically depicting another example of the sensor apparatus in an embodiment.

Some preferred embodiments of the present disclosure are described below with reference to the accompanying drawings. It is to be noted that the drawings are only for explanatory purposes and that the shapes and sizes of constituent elements in actual apparatuses or the proportions in size between such elements may not coincide with the illustrations. The constituent elements necessary for actual implementation are to be suitably provided even if they are not found in the schematically rendered drawings.

Each of the embodiments will be explained in terms of each of the features of the present disclosure.

1. Examples of circuits constituting the sensor apparatus (first through fourth embodiments)
2. Examples of column grouping (fifth through ninth embodiments)
3. Examples of the read timing and examples of the read format (10th through 21st embodiments)
4. Examples of the timing of event detection (22nd through 24th embodiments)
5. Examples of the timing of pixel readout (25th through 28th embodiments)
6. Examples of the timing of and the formats for acquiring gradation information (29th through 33rd embodiments)

[Sensor Apparatus]

Examples of circuits of the sensor apparatus are explained below in a first embodiment through a fourth embodiment of the present disclosure, the examples not being limitative of the circuits.

First Embodiment

FIG. 1 is a block diagram schematically depicting an example of a sensor apparatus as the first embodiment, the example not being limitative thereof. The sensor apparatus 1 includes a pixel array 10, a timing control circuit 12, an access control circuit 14, a first read circuit 16, a first signal processing circuit 18, a timestamp generation circuit 20, and an output interface (referred to as the output I/F 22 hereunder). The sensor apparatus 1 is an apparatus that outputs information regarding a detected event (event data) at high speed. The sensor apparatus 1 may be included in an electronic device such as an imaging apparatus, for example.

The pixel array 10 includes a plurality of pixels 100. The pixels 100 are arranged at least in a plurality of columns (in line direction). Preferably, the pixels 100 may be arranged at least in a plurality of lines (in column direction) in the form of a two-dimensional array. The pixel array 10 has at least three paths: a path for outputting a signal from a pixel 100 to the read circuit, a path which, in the case where an event is detected in the pixel 100, outputs the detected event to the access control circuit 14, and a path that receives input of a signal indicative of the pixel 100 from which the access control circuit 14 reads information.

The pixels 100 each include an imaging element (detection element, sensing element) capable of at least detecting (sensing) an event. Each pixel 100 includes a pixel circuit that drives the detection element and suitably acquires an output from the driven detection element. For example, the pixel circuit may be a circuit that detects and outputs an event by comparing a predetermined threshold value with the value of an analog signal acquired by the detection element. As an example, the pixel 100 may fire in a case where the difference from the preceding frame exceeds a predetermined value. As another example, the pixel 100 may fire in a case where a contrast ratio exceeds a threshold value. Here, the firing indicates the state in which an event is detected by the pixel 100.

The timing control circuit 12 and the access control circuit 14 constitute a control circuit that controls the timing of access to and signal readout from the pixel 100 as well as the timing of processing the signal thus read. The control circuit may also control the timing of outputting the signal having undergone the signal processing.

The timing control circuit 12 outputs a frame synchronization signal and a horizontal synchronization signal to the access control circuit on the basis of an input clock signal, for example. Also, the timing control circuit 12 may generate the timing of executing signal processing on the basis of a signal that corresponds to the status of firing of the pixel 100 and that is received from the access control circuit 14, before outputting the generated timing to the first signal processing circuit 18.

The access control circuit 14 performs control in such a manner that a scan signal for selecting the pixel 100 to be accessed is output on the basis of the horizontal synchronization signal acquired from the timing control circuit 12 and that event information from the accessed pixel 100 is output to the first read circuit 16. That is, the event detection of the present disclosure is implemented by scanning the pixels 100 per frame on the basis of frame information output from the timing control circuit 12.

The first read circuit 16 suitably converts the information acquired from each pixel 100 and outputs the converted information to the first signal processing circuit 18. For example, the first read circuit 16 functions as an AFE (Analog Front End). The first read circuit 16 may provide, for example, each column with a latch for temporarily storing the event information output from each pixel 100. The first read circuit 16 may also include an ADC (Analog to Digital Converter) that suitably performs amplification and AD (Analog to Digital) conversion on an analog signal output from the pixel 100. The ADC may be provided for each pixel or for each column, for example. The first read circuit 16 outputs the suitably converted event information as a serial or parallel signal.

The first signal processing circuit 18 converts the event information output from the first read circuit 16 on the basis of access information acquired via the timing control circuit 12 regarding the pixel 100 controlled by the access control circuit 14, and outputs the converted event information as event data via the output I/F 22 to the outside, such as a processor of an externally provided electronic device. The first signal processing circuit 18 switches the acquired event information in sequence or rearranges its format before output. The first signal processing circuit 18 may also perform signal processing according to the synchronization timing generated by the timing control circuit 12 on the basis of the output from the access control circuit 14 as discussed above.

The timestamp generation circuit 20 outputs timestamp information, or simply time information, for example, to the first signal processing circuit 18. The first signal processing circuit 18 puts a suitable timestamp on data before its output. The suitable time-stamping makes it possible for an external processor etc. to acquire the time sequence of the output data for execution of signal processing.

The output I/F 22 is an interface that outputs to the outside the event data acquired and converted by the sensor apparatus 1. For example, the output I/F 22 may be a MIPI (registered trademark) interface. The sensor apparatus 1 outputs the acquired event information via this output I/F 22 to the outside.

Using the above configuration provides suitable control on a settling-down time in the horizontal direction and the timing of the horizontal synchronization signal in keeping with the amount of data to be acquired.

In this configuration, in particular, the same synchronization signal may be used both as a synchronization signal for control of access to the pixel array 10 (read control by the first read circuit 16) and as a synchronization signal for signal processing control by the first signal processing circuit 18. This enables the sensor apparatus 1 to perform high-speed processing in the case where the rate of data output is determined by the data path.

It is to be noted that the presence of the timing control circuit 12 is not mandatory in the configuration. For example, in the case where either the timing of access to and readout from the pixel 100 or the timing of data transfer from the first read circuit 16 to the first signal processing circuit 18 is kept unchanged, the synchronization signal can be fixed. This allows the sensor apparatus 1 to implement its operations without recourse to the timing control circuit 12.

Second Embodiment

FIG. 2 is a block diagram schematically depicting an example of the sensor apparatus 1 of the second embodiment, the example not being limitative thereof. In the present embodiment, the first signal processing circuit 18 includes a frame memory 180 in particular.

The frame memory 180 is a memory region that stores frame information and includes a memory circuit, for example. The first signal processing circuit 18 may store, in the frame memory 180, the event information corresponding to one frame and acquired from the first read circuit 16. The first signal processing circuit 18 may then use the data in the frame memory 180 to convert the event information to a format for high-speed data transfer for output.

In such a manner, providing the frame memory 180 makes it possible to transfer the event information per frame to the outside. The signal processing of the first signal processing circuit 18 can be performed by use of the frame information as well.

By providing the frame memory 180, the above configuration makes it possible to separate, per scan line, the timing of access control of the pixel array 10 (read control by the first read circuit 16) from the timing of processing control by the first signal processing circuit 18. That is, whereas the access to the pixel array 10 is controlled according to a synchronization signal with a predetermined periodicity, the first signal processing circuit 18 can, despite this control, perform processing using a variable synchronization signal. This enables the sensor apparatus 1 to operate at high speed in the case where the output thereof is determined by the access to the pixels 100.

Third Embodiment

FIG. 3 is a block diagram schematically depicting an example of the sensor apparatus 1 of the third embodiment, the example not being limitative thereof. In the present embodiment, the sensor apparatus 1 includes a second read circuit 24 and a second signal processing circuit 26 in addition to the configuration of the first embodiment.

In the present embodiment, the pixels 100 are each equipped with an element for acquiring gradation information in addition to the element for event detection. The gradation information is, for example, information regarding the intensity of each of the individual RGB colors. The pixels 100 may each include the element for receiving the light of the RGB colors and the element for event detection. As another example, the pixel array 10 may include the pixels 100 each being either a pixel for receiving the light of the RGB colors or a pixel for event detection.

After being scanned by the access control circuit 14, the second read circuit 24 acts as the AFE which acquires an individual-color analog signal output from each pixel 100 and which outputs the acquired analog signal. As with the first read circuit 16, the second read circuit 24 may include, for example, latches and the ADC, but is not limited thereby.

The second signal processing circuit 26 performs signal processing on the basis of individual-color information output from the second read circuit 24 and outputs gradation data to the outside via the output I/F 22. The second signal processing circuit 26 may, for example, perform at least one of a linear matrix process, a defect correction process, image processing, or a machine learning process, but is not limited thereby.

As described above, the apparatus may be configured not only to acquire color information but also to detect events. In this case, there is not much difference between the image information based on the imaged color information and the information regarding the result of event detection, or there is no need to correct such difference. Consequently, the position of event detection in the image information can be output more accurately in a situation where processing costs are kept low.

Fourth Embodiment

FIG. 4 is a block diagram schematically depicting an example of the sensor apparatus 1 of the fourth embodiment, the example not being limitative thereof. In the present embodiment, the sensor apparatus 1 has the first signal processing circuit 18 equipped with a frame memory 180, in addition to the configuration of the third embodiment.

This configuration can provide both the workings of the second embodiment and those of the third embodiment at the same time.

Figure 5:
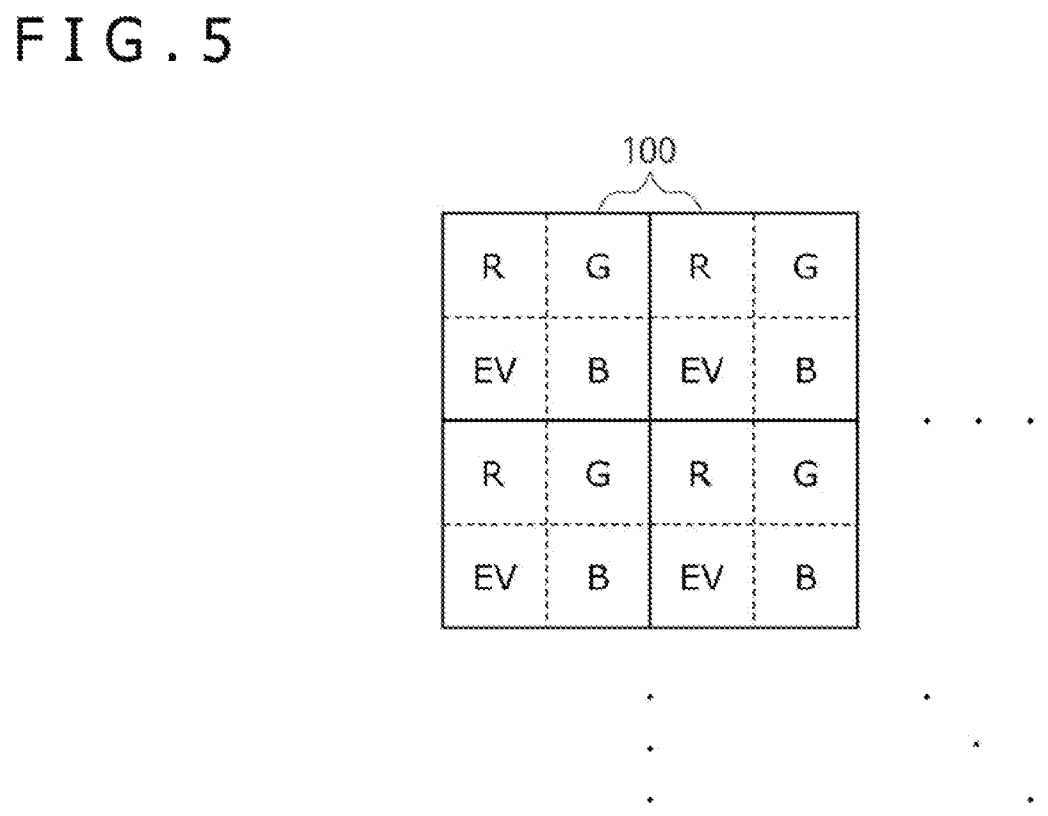

FIG. 5 is a view schematically depicting an example of pixels 100 in the third embodiment or in the fourth embodiment.

A pixel 100 includes, for example, a sub-pixel R for receiving the R (red) color, a sub-pixel G for receiving the G (green) color, a sub-pixel B for receiving the B (blue) color, and a pixel EV for event detection. When configured in such a manner, the pixels can each acquire both color gradation information and event detection information as in the third or fourth embodiment.

The pixel circuit includes a circuit for outputting an analog signal based on event detection and a circuit for outputting an analog signal based on the state of receiving the R, G, and B colors. These circuits are suitably connected to the first read circuit 16 and to the second read circuit 24 respectively.

What is indicated in FIG. 5 is an example and not limitative of the present disclosure, there may be other arrangements of the pixels. For example, as discussed above, the sub-pixels in FIG. 5 may each be configured as a single pixel 100. As another example, the pixels 100 may each be divided into nine portions each suitably including the sub-pixels for the RGB colors and for EV. As a further example, there may be provided pixels for receiving the W (white) color and pixels for receiving IR (infrared) rays. As yet another example, the pixels may each be configured as a pixel that suitably acquires an image plane phase difference etc. or as a pixel that acquires light of different polarization.

The colors may be divided by color filters or by organic photoelectric conversion films. The pixel that acquires color information or detects an event may include an IR cut filter on the basis of the information desired to be acquired.

In such a manner, the combination of the sub-pixels in each pixel 100 or the combination of the pixels 100 themselves can be configured as desired on the basis of the information acquired along with the event detection.

The combination of the pixels in terms of gradation in the third and fourth embodiments may also be applied to combinations with other elements. For example, the pixels for acquiring gradations may be those supporting global shutters. Also, instead of the pixels for acquiring gradations, there may be provided pixels each equipped with the APD (Avalanche Photo Diode) such as SPAD (Single Photon Avalanche Diode) or pixels for iToF (indirect Time of Flight). In this case, the second read circuit 24 and the second signal processing circuit 26 are assumed to be suitably adapted to process signals as well.

[Grouping of Columns]

Explained below are examples of grouping the columns as a fifth embodiment through a seventh embodiment, the examples not being limitative of the grouping. Further explained as an eighth embodiment and a ninth embodiment are examples of implementing the circuits in the above-described first through fourth embodiments.

Fifth Embodiment

FIG. 6 is a view schematically depicting an example of grouping the pixels 100 in the pixel array 10 as one embodiment, the example not being limitative of the grouping. It is assumed that as many as Hpix pixels are arranged in the line direction and Vpix pixels in the column direction in the pixel array 10. As depicted in this figure, the pixels 100 in the pixel array 10 may be divided into a plurality of (four in this case) groups, for example.

The pixel array 10 is divided into four groups for each continuous column. As illustrated in the figure, the pixels 100 arranged in the line direction are divided into four equal portions. With (Hpix/4)×Vpix pixels taken as one group, event detection is performed in the line direction. For example, the pixel array 10 is divided into a first group Gp1, a second group Gp2, a third group Gp3, and a fourth group Gp4 in units of Hpix/4 columns starting from the 0th column.

Regions each indicated as "Event" in the figure are the regions where events are detected. In such a manner, the present embodiment has an event detection target region established not in units of pixels 100 but for each line of the groups. For example, in the case where one group includes four columns, the pixels 100 in four columns per line make up a single event detection region.

As an example, in the case where one or a plurality of any number of pixels 100 fire in an event detection region, it may be determined that an event has occurred in the event detection region. As another example, in the case where the sum (or statistical value such as an average) of the analog values of all pixels in an event detection region exceeds a predetermined value, it may be determined that an event has occurred in the event detection region.

Differently from the above, the access control circuit 14 may simply acquire the status of firing of the pixels 100 in the region (group and scan line) to which the firing pixels 100 belong, without determining whether or not an event has occurred in each of the regions. This makes it possible to extract only the information regarding the regions where at least one pixel has fired.

With the present disclosure, the event detection information is output per such region to the outside.

The above grouping makes it possible to reduce the event detection data compared with the case where the event detection information is output per pixel 100. This contributes to reducing the necessary amount of memory and shortening the time for transmitting the event detection data, i.e., the transfer frame rate.

Sixth Embodiment

FIG. 7 is a view schematically depicting an example of grouping the pixels 100 in the pixel array 10 as one embodiment, the example not being limitative of the grouping. The pixel array 10 may be divided in a sequential and periodic manner in units of one or a plurality of columns.

For example, as depicted in the figure, the pixels may be divided periodically into four groups for one column (or a plurality of columns), such as groups Gp1, Gp2, Gp3, Gp4, Gp1, Gp2, . . . . If the pixels in adjacent divided regions belong to different groups, the groups may be sorted not periodically but in a desired sequence. For example, the groups may be sorted sequentially from left, such as Gp1, Gp2, Gp3, Gp4, Gp2, Gp1, Gp2, Gp4, Gp3, . . . .

Seventh Embodiment

FIG. 8 is a view schematically depicting an example of grouping the pixels 100 in the pixel array 10 as one embodiment, the example not being limitative of the grouping. The pixel array 10 may have the groups sorted for each of the same or different columns in one or a plurality of sizes.

In the fifth embodiment, the same event occurs horizontally in the regions where an image is acquired. For example, in the case where there are numerous targets moving in the line direction, the event information can be obtained more accurately. The sixth embodiment is advantageous in the case where pixels can fire all over the plane, for example. The seventh embodiment is advantageous in the case where the regions for event detection are already known and where an ROI for prioritizing event detection is to be set, for example.

The above division into four groups is only an example. The pixels may be divided into any number of regions. The number of divided groups may be designed as desired on the basis of the granularity (definition) for data acquisition or the amount of data (data transfer rate), for example. Whereas the event detection region in the divided groups is determined by (the number of columns in the groups)×(1 line) above, a plurality of lines may be set to be the event detection region.

Whereas the ensuing embodiments will be explained by use of the division depicted in FIG. 6 (division into four groups by adjacent columns), the division can obviously be applied to the fifth embodiment (with a different number of divided groups), to the sixth embodiment, or to the seventh embodiment as well.

Eighth Embodiment

Figure 9:
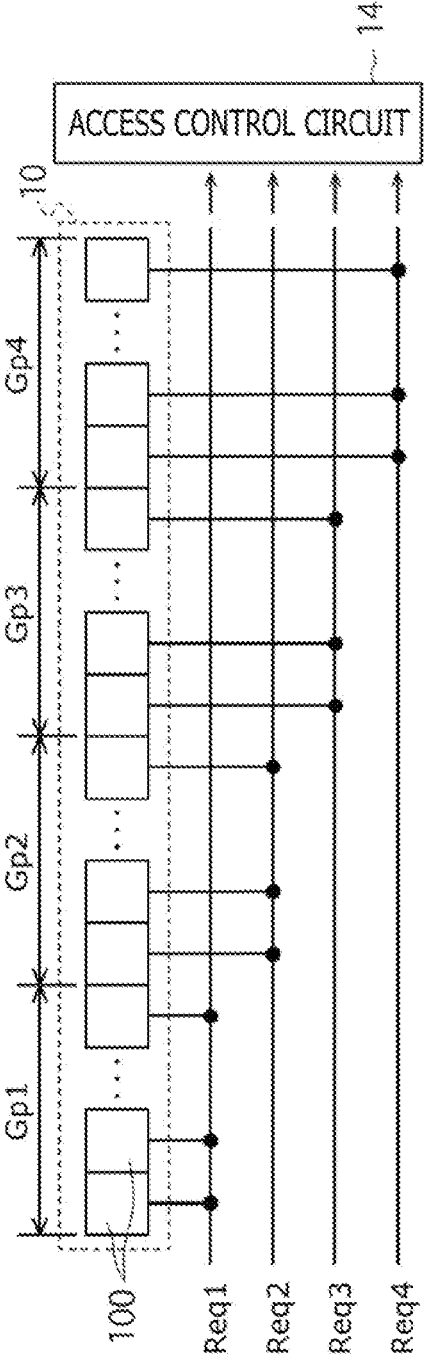
FIG. 9 is a view depicting an example of paths from pixels to an access control circuit in an embodiment.

FIG. 9 is a view depicting connection paths from the pixels 100 in each group to the access control circuit 14 as the eighth embodiment. Each pixel 100 outputs a firing state to the access control circuit 14 and is connected to any one of firing notification lines Req requesting a read scan. The connection paths in FIG. 9 may be provided, for example, for each of the lines of the pixels 100 in the pixel array 10. As another example, the connection paths may be shared by a plurality of lines (i.e., lines not scanned simultaneously).

For example, the pixels 100 belonging to a group Gp1 are each connected to a firing notification line Req1 that is connected to the access control circuit 14. On the basis of an output from the firing notification line Req1 among the lines being scanned, the access control circuit 14 determines whether or not a pixel 100 belonging to the group Gp1 and the scanned line has fired. The result of the determination is used as explained below in conjunction with another embodiment.

Likewise, the pixels 100 belonging to the groups GP2, Gp3, and Gp4 are connected respectively to the firing notification lines Req2, Req3, and Req4 which notify the access control circuit 14 of the state of firing.

In such a manner, in the case where a pixel 100 belonging to the line being scanned in each group is firing, the access control circuit 14 outputs an access control signal for reading out the state of firing of each of the pixels 100 belonging to the same group as the pixel 100. With this wiring arrangement, the control circuit can perform control in such a manner that a plurality of groups is accessed in parallel.

The access control circuit 14 may receive a request from each of the pixels 100 in a predetermined sequence. This makes it possible to determine from which pixel a given request has been received.

Ninth Embodiment

Figure 10:
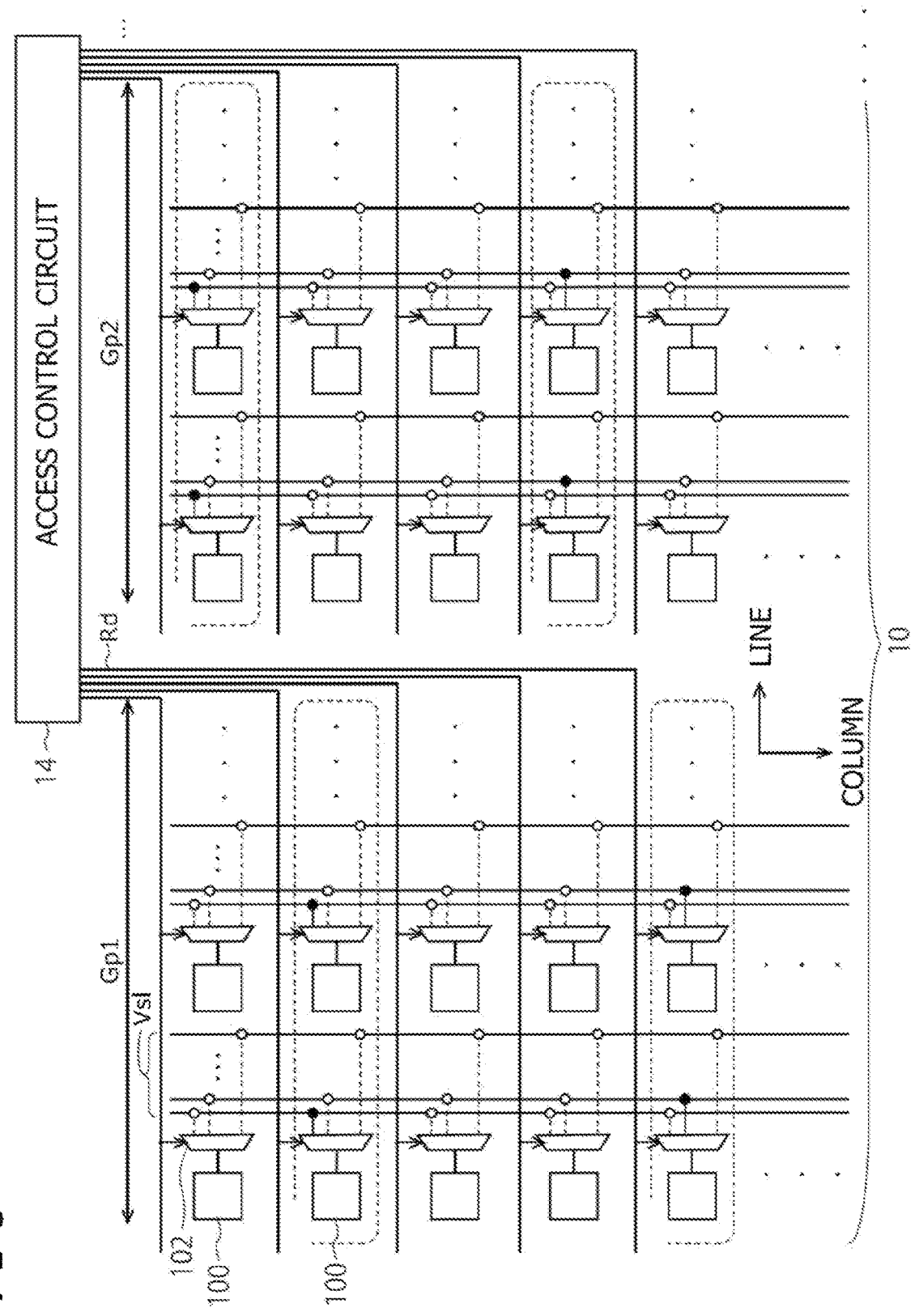
FIG. 10 is a view depicting an example of paths for outputting results of event detection with the access control circuit in an embodiment.

FIG. 10 is a view depicting read request paths from the access control circuit 14 to the pixels 100 of each group as the ninth embodiment. The pixel array 10 provides each pixel 100 with a selector 102 which selects, on the basis of a read signal, a read line Vsl onto which the pixel 100 places an output. The pixel array 10 is further equipped with a plurality of read request lines Rd connected to the access control circuit 14, a plurality of read lines Vsl, and a switch Sw that switches the connection state between each read line Vsl and each selector 102.

A plurality of the read request lines Rd are connected to the selector 102 for the pixels 100 belonging to each group per scan line. The access control circuit 14 gives notification of a selection signal of the read line Vsl to the selector 102 via the read request path Rd. For example, the access control circuit 14 outputs a signal for not selecting any of the read lines Vsl onto the scan line having no firing signal in the eighth embodiment. For the scan line given the output of a firing signal in the group, the access control circuit 14 outputs, to the selector 102, a signal for selecting which signal line is to be used to notify the first read circuit 16 of the signal from the pixel 100.

A plurality of the read lines Vsl are signal lines that transmit the signals from the pixels 100 to the first read circuit 16. In the pixel array 10, each of the columns constituted by the pixels 100 is provided with a plurality of read lines Vsl. Each of the read lines Vsl may be simply connected to the first read circuit 16. As another example, the read line Vsl provided for each column may be wired to the signal line that transmits signals of the same region for connection to the first read circuit 16. For example, the read lines Vsl connected to the selectors 102 in FIG. 10 may be wired as the same signal lines starting from the one closest to the selectors 102 for connection to the first read circuit 16.

On the basis of the signal received from the access control circuit 14, the selector 102 selects which read line Vsl to use for outputting the signal from the pixel 100, and suitably connects the read line Vsl with the pixel 100.

For example, in the group Gp1, the access control circuit 14 confirms firing on the second line from the top and performs control to read the output from this line. In this case, the access control circuit 14 outputs, to the selector 102, a signal for connecting the second line of the group Gp1 to the leftmost read line Vsl for each pixel 100. Upon receipt of this signal, the selector 102 selects a suitable signal line and establishes a connection by which the signal from the corresponding pixel 100 is output to the first read circuit 16.

In the group Gp1, firing is also confirmed on the fifth line from the top, and read access control is performed. The access control circuit 14 outputs, onto the fifth line, a selection signal so as to select a read line Vsl different from the second line. The selector 102 then establishes a suitable output path connection.

With the above configuration and control, it is possible for the pixels 100 to output signals to the first read circuit 16 in such a manner that the groups can be recognized. In the vertical scan, the access control circuit 14 can perform access control simultaneously of a plurality of scan lines to be output.

Also, since each group can be simultaneously accessed, the time for data input and output can be shortened in the case where the readout by the first read circuit 16 and the transfer therefrom are carried out in parallel in terms of timing. For example, in FIG. 10, the second scan line in the group Gp1 and the first scan line in the group GP2 can be accessed with the same timing when the access control circuit 14 suitably receives firing signals and performs read access control. That is, the first read circuit 16 can parallelly acquire and process the event information from these two regions with the same timing.

In such a manner, the above access control makes it possible to shorten the processing time and data transfer time in the case where signals are transmitted and received in parallel.

[Read Timing and Read Format]

Explained below are examples of the circuits in the sensor apparatus as a 10th embodiment through a 21st embodiment, the examples not being limitative of the sensor apparatus circuits.

10th Embodiment

FIG. 11 is a view schematically depicting an example of the sequence of readout per group as one embodiment. As depicted in this figure, the access control circuit 14 may perform control to read the event information vertically per group. As illustrated in FIG. 11, the event information may be read out starting from the group including left columns. As another example, the event information may be read out per group in a desired sequence.

FIG. 12 is a view depicting the timing of readout as in the case in FIG. 11. For example, "Event (Gp1)" indicates readout of an event detected in group 1. According to a synchronization signal, events are read out one at a time per event region.

Events are read out successively one at a time starting from the leftmost group in FIG. 11. The readout in such a manner makes it possible to reduce data bandwidth, thereby reducing the circuit area and lowering power consumption.

11th Embodiment

FIG. 13 is a view schematically depicting an exemplary format of output from the first signal processing circuit 18 in the case where data readout is performed by the 10th embodiment.

Reference sign FS denotes the start of a frame, and reference sign FE denotes the end of a frame. Reference sig PH denotes the header of a packet, and reference sign PF denotes the footer of a packet. These parts may each be represented by a suitable predetermined bit string. Suitable information such as frame numbers and packet numbers may also be embedded. The wording "Embedded" stands for embedded information, and suitable information is embedded therein.

The first signal processing circuit 18 generates a transfer signal for output to the outside on the basis of the information regarding the scan lines and groups to be accessed and input from the access control circuit 14 via the timing control circuit 12 and the event information output from the first read circuit 16. For example, the first signal processing circuit 18 may successively arrange the identifiers (or simply numbers) of the groups and scan lines where events are detected and embed the identifiers in "Embedded."

An external processor can read the information from "Embedded" to determine how the event information from which region is included in which sequence in the data.

Figure 18:
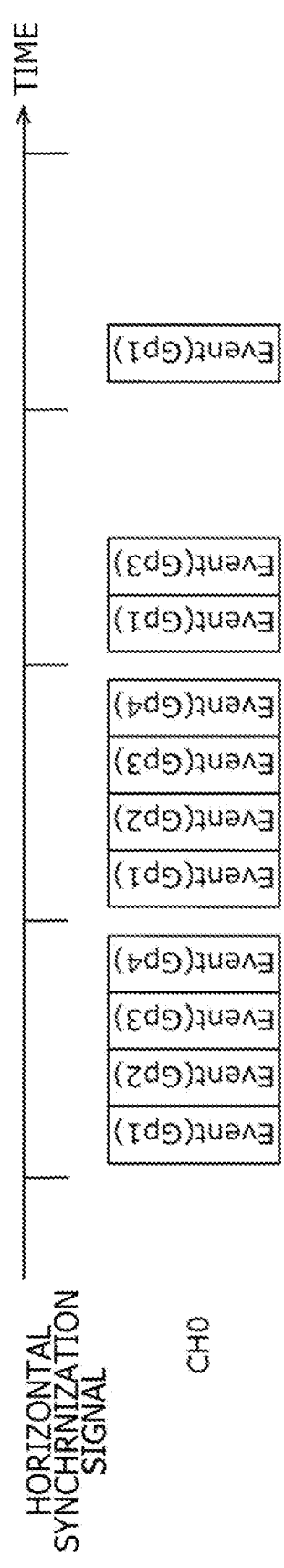
FIG. 18 is another view depicting the timing of reading groups in an embodiment.

For example, as depicted in FIG. 18, the generated signal may be put in a format in which packets supplemented with a header and a footer each for one event are generated and arranged successively in a frame. The header and the footer may simply be signs that indicate a start and an end of event information per region. As another example, in the case where the information regarding the groups and scan lines is not added to "Embedded," the header may be supplemented with information indicating to which group and to which scan line the region of the immediately ensuing information pertains.

The information regarding the region where an event is detected may be added either as data or as a header, as described above. The case in which the information is added as the data offers the advantage that the degree of freedom of the data format is high with no need for change in interface specifications. On the other hand, the case where the information is added as the header provides the advantage that only a minimum of identifiers are needed, resulting in a reduction in the quantity of data involved.

In such a manner, events may be arranged into packets for output in a sequential format per region where an event is detected.

12th Embodiment

FIG. 14 is a view schematically depicting another exemplary format of output from the first signal processing circuit 18 in the case where data readout is performed by the 10th embodiment.

As depicted in FIG. 14, the event information may be output concatenated in a manner having the same length as the line. For example, since there are four groups in the present embodiment, the event information regarding the four groups may be concatenated to form a single packet. This type of format makes it possible to use the same signal for controlling both the synchronization signal for line scan in the pixel array 10 and the synchronization signal for output from the first signal processing circuit 18.

13th Embodiment

FIG. 15 is a view schematically depicting another exemplary format of output from the first signal processing circuit 18 in the case where data readout is performed by the 10th embodiment.

In the present embodiment, in the case where the last packet falls short of the line length, a packet is generated with dummy data embedded to fill the missing portion. In the 12th embodiment, as depicted in FIG. 14, the packets may or may not have a fixed length each. In the present embodiment, by contrast, the packets are each allowed to have a fixed length.

This format, which keeps the packets fixed in length, may be suited for cases subject to constraints stemming from the communication interface, for example. Keeping the packet length fixed also enables some processors to carry out their processes more easily. In these cases, embedding dummy data to make the packets fixed in length as in the present embodiment is an advantage.

14th Embodiment

FIG. 16 is a view depicting an example of the sequence of readout per group in the present embodiment. In the 10th embodiment, the reading sequence per group is serial. However, this is not limitative of the reading sequence. In the present embodiment, the access from the pixels 100 per group is carried out in parallel.

Figure 17:
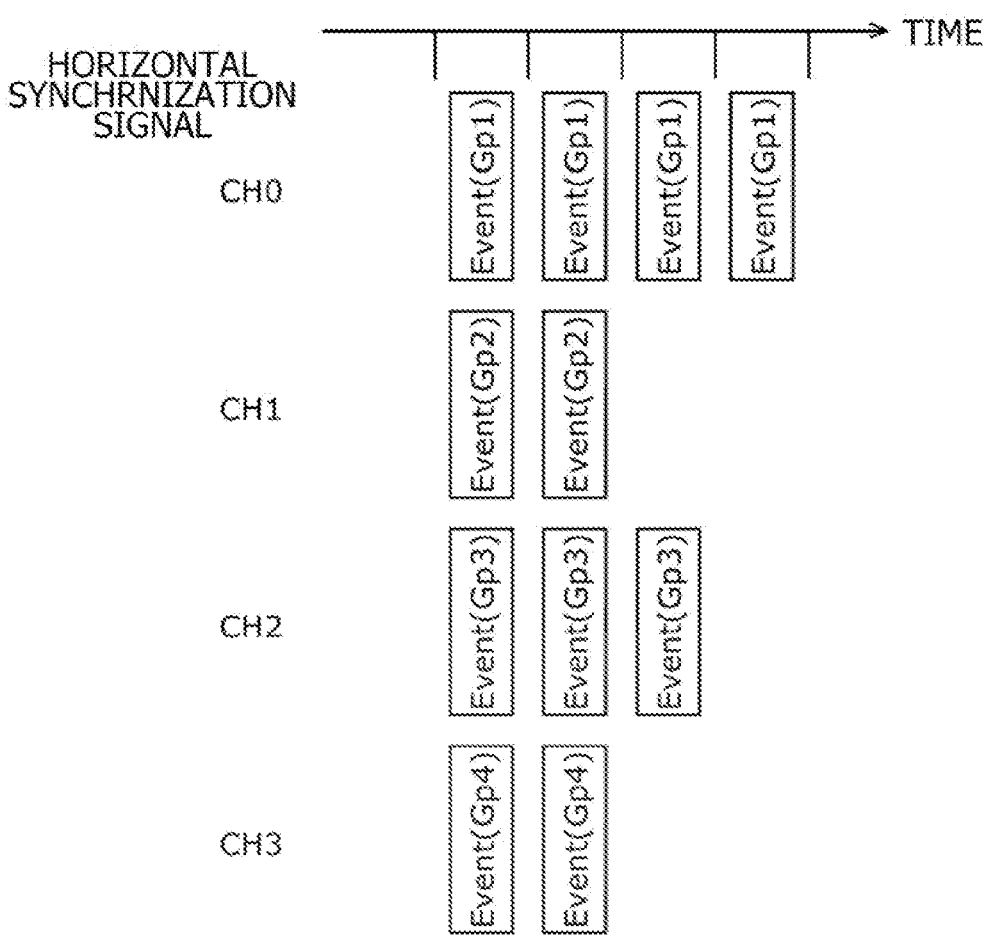
FIG. 17 is a view depicting the timing of reading groups in an embodiment.

FIG. 17 depicts an example of how the readout in FIG. 16 is performed by the first read circuit 16, and FIG. 18 gives an example of how signals are transferred from the first read circuit 16 to the first signal processing circuit 18 during readout.

As depicted in FIG. 17, data can be transferred in parallel on a plurality of channels CH0, CH1, CH2, and CH3. Also, as illustrated in FIG. 18, a single channel may be used to concatenate parallelly-acquired data for successive data transfer.

In any case, the synchronization signal for data transfer may be a periodic signal having a fixed periodicity.

Although the parallel readout entails a wider circuit area and more power consumption than those in the 10th embodiment, the read time can be shortened. In such a manner, either the reading with the 10th embodiment or the reading with the 14th embodiment may be selected as needed depending on the situation.

15th Embodiment

FIG. 19 is a view schematically depicting another exemplary format of output from the first signal processing circuit 18 in the case where data readout is performed by the 14th embodiment.

The first signal processing circuit 18 may make up packets by concatenating, per channel, the data transferred from the first read circuit 16 on the basis of the synchronization signal.

16th Embodiment

FIG. 20 is a view schematically depicting another exemplary format of output from the first signal processing circuit 18 in the case where data readout is performed by the 14th embodiment.

The first signal processing circuit 18 may make up packets by concatenating, per channel, the data transferred from the first read circuit 16 without changing the sequence of the groups. The group sequence is the sequence of event detection regions in the packets. Dummy data is embedded to fill the parts where no event is detected. For example, since a third data transfer is missing in the group Gp2, the part corresponding to the group Gp2 in the third packet is filled with dummy data.

In such a manner, the packets are made fixed in length by embedding dummy data in the example in FIG. 19. The data region of each of the groups making up the packets is maintained by embedding dummy data. This may turn out to be advantageous in subsequent processes following output to an external processor.

17th Embodiment

FIG. 21 is a view schematically depicting another exemplary format of output from the first signal processing circuit 18 in the case where data readout is performed by the 14th embodiment.

In the 16th embodiment, the dummy region is set in a manner not changing the storage regions of the groups in the packets. However, this is not limitative of how the group storage regions in the packets are kept unchanged. For example, as depicted in FIG. 21, the event information may be left-justified in a packet followed by dummy data to align with the line length.

The 15th through 17th embodiments offer an easy-to-implement format in the case of the 14th embodiment in which the event information from each region is acquired either as a parallel signal or as a serial signal with the synchronization signal having the same periodicity.

As explained above, the periodicity of the synchronization signal is fixed for the 10th through 17th embodiments.

This eliminates the need for the process of causing the timing control circuit 12 in FIGS. 1 through 4 to make the synchronization signal variable.

18th Embodiment

On the other hand, in the case where the ensuing embodiment uses a synchronization signal with a variable periodicity, the timing control circuit 12 in FIGS. 1 through 4 generates the timing of synchronization on the basis of the information regarding the firing pixels acquired from the access control circuit 14. On the basis of the synchronization timing generated by the timing control circuit 12, the access control circuit 14 outputs access control (read control of the first read circuit 16) on the pixels 100 as needed. Likewise, the access control circuit 14 outputs, as needed, the timing of signal processing control of the first signal processing circuit 18.

FIG. 22 is a view depicting an example of the sequence of readout per group in the present embodiment. As in the case of FIG. 18, the parallelly-read event information is transferred as serial information. Whereas the synchronization signal in FIG. 18 has a fixed periodicity and allows the serial signal to be transferred with a periodic timing, the synchronization signal in FIG. 22 has a variable periodicity and causes the serial signal to be transferred with an aperiodic timing. In such a manner, the first read circuit 16 can serially transfer the parallelly-acquired data while prioritizing the data transfer rate. It is to be noted, however, that a variable synchronization signal needs to be defined to allow the first signal processing circuit 18 to suitably carry out its processing.

19th Embodiment

The format depicted in FIG. 19 may be used as a format in which, in the case of data readout by the 18th embodiment, the data is output from the first signal processing circuit 18.

As in the 15th embodiment, the first signal processing circuit 18 may make up packets by concatenating, per channel, the data transferred from the first read circuit 16 on the basis of the synchronization signal.

20th Embodiment

Figure 23:
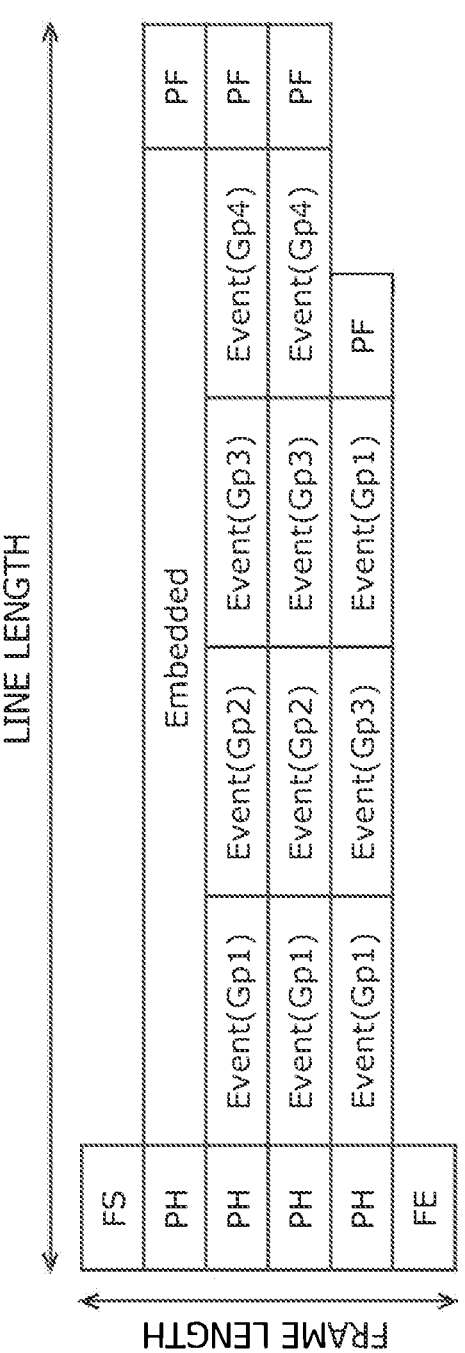
FIG. 23 is a view depicting another exemplary transfer format of an embodiment.

FIG. 23 is a view schematically depicting another exemplary format of output from the first signal processing circuit 18 in the case where data readout is performed by the 14th embodiment.

The first signal processing circuit 18 may make up packets in a manner filling the line in the order in which data is received as the serial signal.

21st Embodiment

FIG. 24 is a view schematically depicting another exemplary format of output from the first signal processing circuit 18 in the case where data readout is performed by the 14th embodiment.

The first signal processing circuit 18 may make up packets in a manner filling the line in the order in which data is received as the serial signal. Further, as with the 13th embodiment, for packet length alignment, in the case where the last packet falls short of the line length, dummy data may be embedded for line length alignment. In the case of such transfer as in FIG. 22, the packets may or may not be kept fixed in length. With the present embodiment, the packets can always be made fixed in length.

This format, which keeps the packets fixed in length, may be suited for cases subject to constraints stemming from the communication interface, for example. Keeping the packet length fixed also enables some processors to carry out their processes more easily. In these cases, embedding dummy data to make the packets fixed in length as in the present embodiment is an advantage.

Whereas there are various transfer formats as described above, any one of them may be selected as needed depending on the circuit area inside the sensor apparatus 1, its power consumption, memory regions, or transfer rates, the specifications of transfer from the sensor apparatus 1 to an external processor and the transfer rate involved, and the specifications of the processor external to the sensor apparatus 1 or the processing details of the processor.

Selection of the format may be implemented by hardware or executed in software processing by the first signal processing circuit 18, for example. In the case of the execution in software, it is preferred, but not mandatory, to select a suitable format in consideration of the hardware specifications such as the signal lines for transfer.

In the 10th through 21st embodiments, timestamps generated by the timestamp generation circuit 20 may be put on the event information or packet data if necessary. The timestamp may also be put on each event, for example.

[Timing of Event Detection]

Explained below are examples of the timing of event detection in the sensor apparatus as a 22nd embodiment through a 24th embodiment, the examples not being limitative of the event detection timing.

22nd Embodiment

In conjunction with the above-described embodiments, the timing of detecting events has not been discussed in particular. For example, the timing of event detection may be performed according to a predetermined frame rate. In all pixels where events are detected, the detection and reading may be carried out with the same timing. On the other hand, the detection timing may be set for each group. The setting may be variable and need not be fixed.

Figure 25:
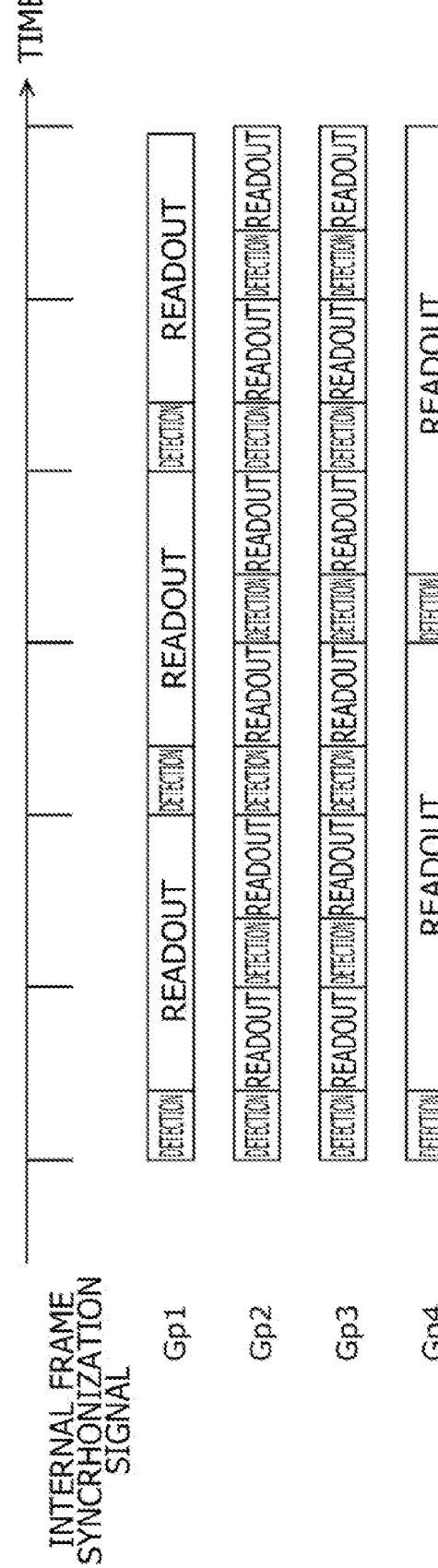
FIG. 25 is a view depicting an example of the timing of event detection and the timing of readout in an embodiment.

FIG. 25 is a view depicting an example of the timing of event detection and the timing of event information readout by the present embodiment. For example, in the case where the groups Gp2 and Gp3 present a higher frequency of event detection, i.e., of firing of the pixels 100, than the groups Gp1 and Gp4, the frequency of event detection and the frequency of information readout of the groups Gp2 and Gp3 may be raised. In the case where the group Gp4 presents a lower frequency of event detection than the group Gp1, the frequency of event detection and the frequency of information readout of the group GP4 may be lowered.

FIG. 26 is a flowchart depicting an exemplary process of setting the timing of event detection and the timing of readout by the present embodiment.

The access control circuit 14 acquires the result of detecting events in the pixels 100 according to a predetermined frame rate (S100).

On the basis of requests from the firing pixels 100, the access control circuit 14 performs control to read events per scan line and per group. Under such control, the first read circuit 16 reads events from the pixels 100 per region (S102). The read information is transferred either as a serial signal or as a parallel signal to the first signal processing circuit 18.

The first signal processing circuit 18 counts the number of events detected per group (S104). The counting may alternatively be performed not by the first signal processing circuit 18 but by the first read circuit 16. In the latter case, the result of the counting is also transmitted to the first signal processing circuit 18 in series or in parallel with the signal transmission.

According to the counted number of events, the first signal processing circuit 18 determines the frequency of access for each group (S106). The first signal processing circuit 18 notifies the timing control circuit 12 of the access frequency thus determined. It is to be noted that, in the case where the frequency remains unchanged, the notification is not mandatory.

On the basis of the access frequency received from the first signal processing circuit 18, the timing control circuit 12 outputs timing signals for detection and readout to the access control circuit 14 and updates the access frequency per group (S108).

According to the updated access frequency, the detection of the pixels 100 and the signal readout of the first read circuit 16 are executed (S100 and S102). The access frequency per group is updated at any time on the basis of the detection result.

According to the detection frequency per group, the sensor apparatus 1 can set the access frequency for each group. Updating the access frequency in such a manner makes it possible to perform detection at a high rate on the groups including the regions where many events are being generated. Using the sensor apparatus 1 enables detection and readout with a higher frequency in the regions where moving targets are present, which permits detection with higher accuracy. Since the access frequency is raised locally per group, the overall frame rate etc. need not be increased. That is, it is possible to perform detection with high accuracy while minimizing an increase in power consumption.

23rd Embodiment

Explained below in more detail in conjunction with the present embodiment are the timing of access control of the pixel array 10 described above as an advantage of the first embodiment (or third embodiment) and the timing of signal processing control by the first signal processing circuit 18.

Figure 27:
FIG. 27 is a view depicting an example of the timing of readout and the timing of transfer in an embodiment.

FIG. 27 is a view depicting the timing of access (read timing of the first read circuit 16) to the pixel array 10 in the first embodiment (or third embodiment) and the timing of signal processing by the first signal processing circuit 18. Although data is transferred serially in this example, the data may alternatively be transferred in parallel.

For example, the access timing of the pixel array 10 and the synchronization signal for the timing of processing by the first signal processing circuit 18 are executed with the same timing generated by the timing control circuit 12.

In such a manner, the configuration depicted in FIG. 1 (or FIG. 3) makes it possible to align the synchronization timing of each configuration and to allow the periodicity of the synchronization to be variable. This makes it possible, as discussed above in conjunction with the first embodiment, to increase the rates of processing and of output of the sensor apparatus 1 in the case where the output of the sensor apparatus 1 is rate-determined by the data path.

24th Embodiment

Explained below in more detail in conjunction with the present embodiment are the timing of access control of the pixel array 10 described above as an advantage of the second embodiment (or fourth embodiment) and the timing of signal processing control by the first signal processing circuit 18.

Figure 28:
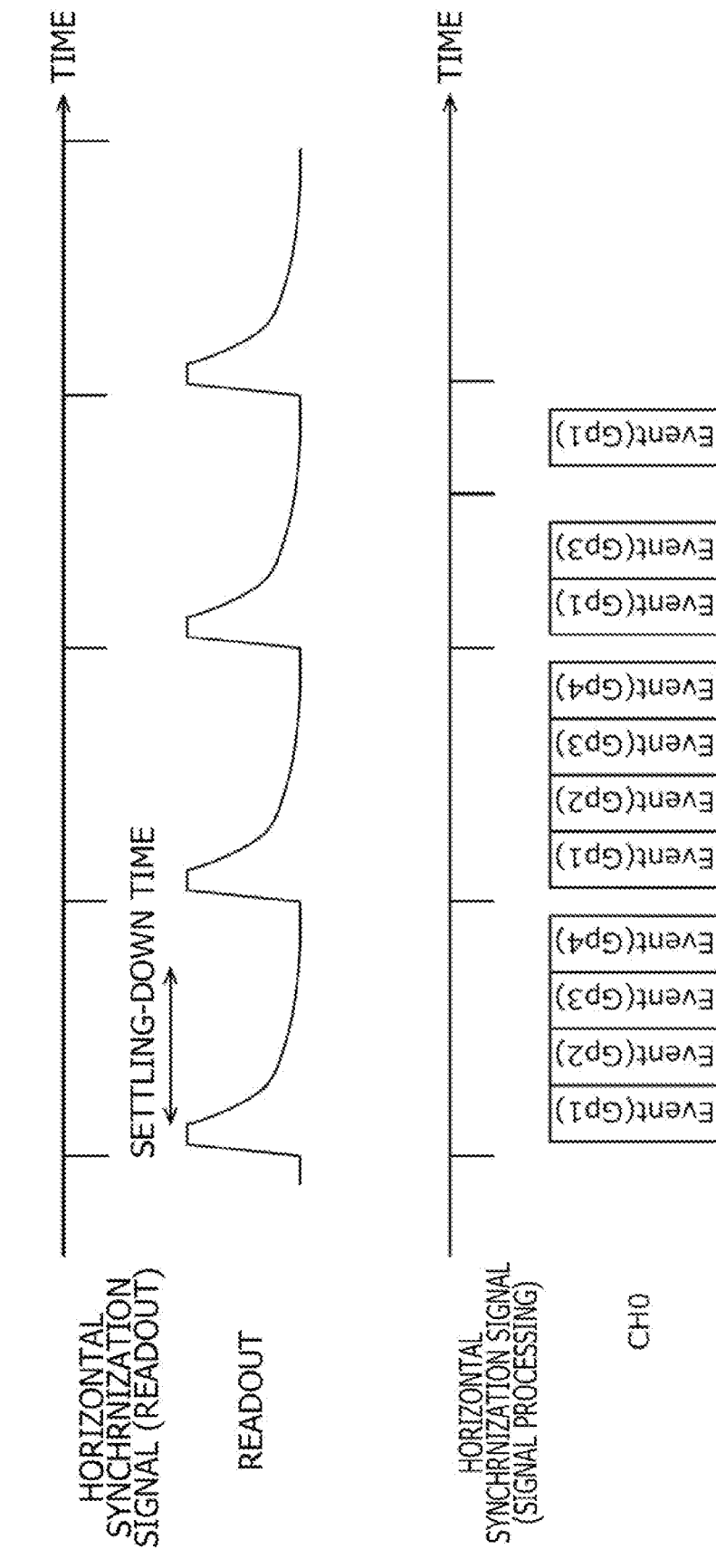
FIG. 28 is a view depicting another example of the timing of readout and the timing of transfer in an embodiment.

FIG. 28 is a view depicting the timing of access (read timing of the first read circuit 16) to the pixel array 10 by the second embodiment (or fourth embodiment) and the timing of signal processing of the first signal processing circuit 18. Although data is transferred serially in this example, the data may alternatively be transferred in parallel.

For example, the access timing of the pixel array 10 and the synchronization signal for the timing of processing by the first signal processing circuit 18 are executed with appropriate timing generated by the timing control circuit 12. The timing can be made different by providing the first signal processing circuit 18 with a frame memory 180.

While setting the access timing of the pixel array 10 to a predetermined periodicity, the timing control circuit 12 can change the timing of signal processing of the first signal processing circuit 18 on the basis of the status of firing of the pixels 100 acquired by the access control circuit 14. That is, the timing control circuit 12 acquires beforehand the number of regions where events are to be detected, and, on the basis of the number of event detection regions thus obtained in advance, can variably control the synchronization signal for signal processing of the first signal processing circuit 18.

For example, as depicted in FIG. 28, the periodicity of the synchronization timing of signal processing is prolonged or shortened on the basis of the number of event detection regions. According to the synchronization timing thus generated, the timing control circuit 12 controls the timing of signal processing of the first signal processing circuit 18. On the basis of the synchronization timing generated by the timing control circuit 12, the first signal processing circuit 18 can perform signal processing on a signal at a suitable timing at which the signal is acquired.

In such a manner, the configuration depicted in FIG. 2 (or FIG. 4) makes it possible to control the synchronization timing of each configuration at a different timing and to suitably fix or vary the periodicity of the synchronization. In this case, upon readout of pixel information from the pixel circuit of the pixels 100 for event detection or from the first read circuit 16, even if the settling-down time is longer than that indicated in FIG. 27, it is possible to suitably control the timing of event information transfer and the timing of signal processing. This in turn makes it possible to increase the processing and output rates of the sensor apparatus 1 in the case where the output of the sensor apparatus 1 is rate-determined by the access to the pixels 100.

[Pixel Readout Timing]

The timing of pixel readout is explained below using a 25th embodiment through a 28th embodiment.

25th Embodiment

FIG. 29 is a view depicting an example of the timing of frame and pixel readout in event detection. As depicted in this figure, the pixels may be accessed across frames. In the case of FIG. 29, for example, frames A and B have the same timestamp.

For example, the shortest update rate may be defined for data read access in which only the firing scan lines are accessed. Using the update rate as the frame rate, the timing control circuit 12 generates a frame synchronization signal. Since this frame rate is the shortest update rate, in the case where there are not many firing lines, the reset and detection of the pixels 100 can be controlled efficiently.

On the other hand, in the case where there are more firing lines, the pixel array 10 may be accessed across frames as depicted in FIG. 29.

26th Embodiment

FIG. 30 is a view depicting another example of the timing of frame and pixel readout in event detection. As depicted in FIG. 30, in the case where the pixel array 10 is accessed across frames, there may exist an interval which corresponds to detection or a reset time and in which no readout is performed during transition between frames A and B, for example.

27th Embodiment

Figure 31:
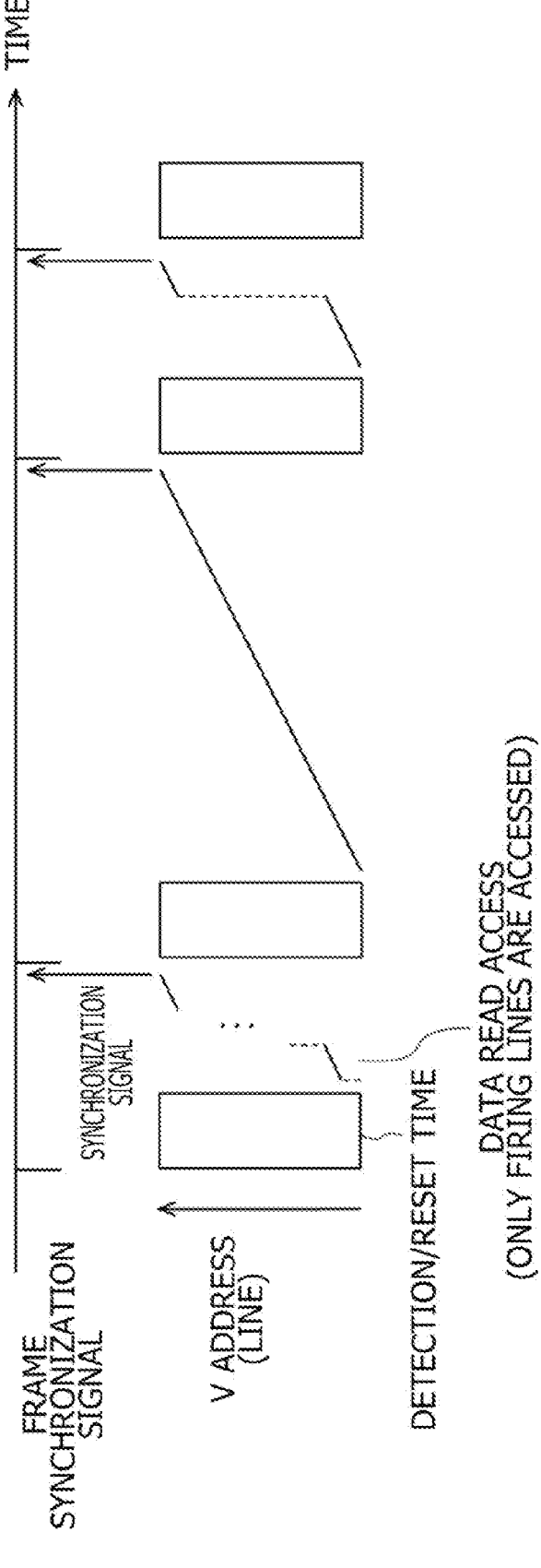
FIG. 31 is a view depicting another example of the timing of frame readout and the timing of pixel readout in an embodiment.

FIG. 31 is a view depicting another example of the timing of frame and pixel readout in event detection. Unlike in FIGS. 29 and 30, the frame synchronization signal may be issued not with a fixed periodicity but upon completion of a single-frame scan. For example, the access control circuit 14 may obtain the completion of scanning of all lines and, on the basis of this timing, the timing control circuit 12 may issue the frame synchronization signal.

28th Embodiment

As described above, synchronization may be performed not on individual frames but on a combination of a plurality of frames so as to implement a fixed frame rate.

FIG. 32 is a view depicting another example of the timing of frame and pixel readout in event detection. For example, in each frame, the access to the pixel array 10 is controlled by the frame synchronization process in FIG. 29 etc. A fixed frame rate that combines a plurality of frames is set as a base frame rate. The base frame rate may alternatively be determined according to the specifications of the output I/F 22. For example, the base frame rate may be set in keeping with the slow Vsync etc. of MIPI.

The information regarding a plurality of frames is acquired and successively output. The last frame belonging to the base frame rate may be filled with dummy data in place of the whole information. Making such settings allows the last frame of the base frame rate to become an invalid frame. Setting the invalid frame in such a manner makes it possible to prevent access to the pixel array 10 beyond the base frame rate.

In such a manner, the data in a plurality of output frames may be combined and output at a fixed-length output frame rate setting an access rate to be variable. The fixed length of the output frame rate may be set on the basis of a trigger periodicity input from the outside.

[Timings and Formats in the Case where Gradation Information is Acquired]

The timing of pixel readout is explained below using a 29th embodiment through a 33rd embodiment.

29th Embodiment

FIG. 33 is a view depicting an example of the timing of reading event detection information and gradation information. For example, this type of situation occurs in the third and fourth embodiments.

In the case where gradation information is acquired, the timing control circuit 12 and the access control circuit 14 may control gradation acquisition and event detection with different synchronization timings. For example, as depicted in the upper part of FIG. 33, the second read circuit 24 reads RGB gradation information from the imaging elements outputting the RGB gradation on the basis of the synchronization signal for gradation acquisition.

On the basis of the data transferred from the second read circuit 24, the second signal processing circuit 26 performs suitable signal processing before output to the outside. Whereas only one I/F is depicted in FIGS. 3 and 4, there may be provided another output I/F, not illustrated and different from the output I/F 22, for outputting the gradation information.

On the other hand, event detection is carried out as explained above in conjunction with the foregoing embodiments with a timing independent of the timing of gradation acquisition.

In such a manner, gradation output and event information output may be performed at different timings, i.e., on the basis of different synchronization signals.

30th Embodiment

In the case where the above-described output is performed, FIG. 34 is a view depicting an exemplary format for outputting both gradation information and event information in combination. The wording "Intensity" in the figure denotes gradation data.

As depicted in FIG. 34, virtual channels are used to generate separate packets of the gradation data and event information, the packets being formatted for output. The event information can be formatted as with the above-described embodiments.

31st Embodiment

FIG. 35 is a view depicting another exemplary format for outputting both gradation information and event information in combination. As depicted in FIG. 35, the gradation information and the event information may be output in combination with super frames.

32nd Embodiment

FIG. 36 is a view depicting another exemplary format for outputting both gradation information and event information in combination. As depicted in FIG. 36, the gradation information and the event information may be combined with super frames and output in combination. For example, the gradation information and the event information may be included in the same packet formatted for output.

The sensor apparatus in all of the foregoing embodiments may be used in a distance measurement system of onboard equipment, in surveillance cameras, and in observation cameras, for example.

The embodiments discussed above may be configured as follows.

(1)

A sensor apparatus including:

a pixel array having a plurality of pixels arranged in an array pattern, the pixels each including a detection element for detecting an event, the array including at least a plurality of columns and at least one line;

a control circuit configured to control scanning of the pixels in units of frames;

a read circuit configured to read the event detected by the detection element with a timing controlled by the control circuit; and a signal processing circuit configured to process and output a signal read by the read circuit, in which, with the plurality of columns divided into groups at least one of which includes a plurality of the columns, the control circuit controls the group to be accessed, and the read circuit acquires the signal from the pixel accessed by the control circuit.

(2)

The sensor apparatus according to (1), in which the group includes at least a plurality of the columns that are adjacent.

(3)

The sensor apparatus according to (1), in which the group includes at least a plurality of the columns that are not adjacent.

(4)

The sensor apparatus according to (1), in which the control circuit performs control to access the line firing in the group.

(5)

The sensor apparatus according to (4), in which the control circuit performs control parallelly to access a plurality of the groups.

(6)

The sensor apparatus according to (5), in which a synchronization signal for accessing to and performing read control of the pixels and a synchronization signal for controlling processing of the read signal have the same fixed periodicity.

(7)

The sensor apparatus according to (5), in which a synchronization signal for accessing to and performing read control of the pixels and a synchronization signal for controlling processing of the read signal each have a variable periodicity.

(8)

The sensor apparatus according to (7), in which the synchronization signal for accessing to and performing the read control of the pixels and the synchronization signal for controlling processing of the read signal have the same periodicity.

(9)

The sensor apparatus according to (7), in which the signal processing circuit includes a frame memory, and the synchronization signal for accessing to and performing the read control of the pixels and the synchronization signal for controlling processing of the read signal each have a different periodicity.

(10)

The sensor apparatus according to (1), in which the control circuit controls access to the pixels belonging to each of the groups, the access being made successively from one group to another.

(11)

The sensor apparatus according to (10), in which the control circuit controls access to each of the groups in a desired sequence starting from a desired one of the groups.

(12)

The sensor apparatus according to (1), in which the control circuit performs control in a manner changing a read frequency for each of the groups.

(13)

The sensor apparatus according to (1), in which the signal processing circuit outputs data in which data regarding a plurality of scan lines is arranged onto the same line.

(14)

The sensor apparatus according to (1), in which the read circuit reads the event from the pixel array according to a frame synchronization signal across a plurality of frames.

(15)

The sensor apparatus according to (14), in which, in the case of reading the event from the pixel array according to the frame synchronization signal across the plurality of frames, the read circuit has time not to access the pixels between the frames.

(16)

The sensor apparatus according to any one of (1) to (15), in which the control circuit issues a frame synchronization signal at a timing when scanning of the pixel array is completed, thereby generating an output frame rate.

(17)

The sensor apparatus according to any one of (1) to (16), in which the control circuit outputs event information regarding a plurality of frames using a base frame rate concatenating the plurality of frames, the control circuit further setting a frame at the end of the base frame rate as a dummy frame.

(18)

The sensor apparatus according to any one of (1) to (17), in which the pixel array acquires gradation information regarding light received by the pixels, and the pixel array further outputs the acquired gradation information.

(19)

The sensor apparatus according to any one of (1) to (18), in which data in a plurality of output frames are combined and output at a fixed-length output frame rate setting an access rate to be variable.

(20)

The sensor apparatus according to (19), in which the fixed length of the output frame rate is set on the basis of a trigger periodicity input from the outside.

The embodiments of the present disclosure are not limited to those discussed above and include diverse variations that may be conceived by persons skilled in the art. Also, the advantageous effects of the present disclosure are not limited to those stated above. The constituent elements of the embodiments may be suitably combined when in use. That is, various additions, changes, and partial deletions can be made within the technical idea and scope of the present disclosure as defined by the appended claims and their equivalents.

REFERENCE SIGNS LIST

1: Sensor apparatus
10: Pixel array
100: Pixel
102: Selector
Rd: Read request line
Req1, Req2, Req3, Req4: Firing notification line
Vsl: Read line
12: Timing control circuit
14: Access control circuit
16: First read circuit
18: First signal processing circuit
20: Timestamp generation circuit
22: Output I/F
24: Second read circuit
26: Second signal processing circuit

The invention claimed is:

1. A sensor apparatus, comprising:

a two-dimensional pixel array that includes a plurality of pixels, wherein each of the plurality of pixels includes a respective detection element, the respective detection element is configured to detect a respective event associated with the each of the plurality of pixels, the plurality of pixels includes a plurality of groups of pixels, and each of the plurality of groups of pixels includes a plurality of columns of pixels;

a control circuit configured to:

control a scanning process of the plurality of pixels, wherein the scanning process of the plurality of pixels is in units of frames;

control an access to a specific group of pixels of the plurality of groups of pixels;

select a specific pixel of the plurality of pixels, wherein the specific group of pixels includes the specific pixel;

detect a firing status of the specific pixel;

output a synchronization timing based on the detected firing status of the specific pixel; and control a timing to detect a specific event of the specific pixel, wherein the firing status of the specific pixel corresponds to the specific event;

a read circuit configured to:

read the specific event based on the controlled timing to detect the specific event; and acquire, from the specific pixel, a signal based on the read specific event; and a signal processing circuit configured to:

receive the signal from the read circuit;

process the signal based on the synchronization timing; and output the processed signal.

2. The sensor apparatus according to claim 1, wherein the plurality of columns of pixels includes a set of adjacent columns of pixels.

3. The sensor apparatus according to claim 1, wherein the plurality of columns of pixels includes a set of non-adjacent columns of pixels.

4. The sensor apparatus according to claim 1, wherein the specific group of pixels further includes a line of pixels, the line of pixels is different from the plurality of columns of pixels, the line of pixels includes a set of pixels, and the control circuit is further configured to:

detect a firing status of each of the set of pixels; and control an access to the line of pixels, based on the firing status of the each of the set of pixels.

5. The sensor apparatus according to claim 4, wherein the control circuit is further configured to control, at a specific time, an access to each of the plurality of groups of pixels.

6. The sensor apparatus according to claim 5, wherein the control circuit is further configured to:

generate a first synchronization signal to perform read control of the specific pixel; and generate a second synchronization signal to control the processed signal, the first synchronization signal corresponds to the controlled timing to detect the specific event, the second synchronization signal corresponds to the synchronization timing, and a fixed periodicity of the first synchronization signal is equal to a fixed periodicity of the second synchronization signal.

7. The sensor apparatus according to claim 5, wherein the control circuit is further configured to:

generate a first synchronization signal to perform read control of the specific pixel; and generate a second synchronization signal to control the processed signal, the first synchronization signal corresponds to the controlled timing to detect the specific event, the second synchronization signal corresponds to the synchronization timing, and each of a periodicity of the first synchronization signal and a periodicity of the second synchronization signal is variable.

8. The sensor apparatus according to claim 7, wherein the periodicity of the first synchronization signal is equal to the periodicity of the second synchronization signal.

9. The sensor apparatus according to claim 7, wherein the signal processing circuit includes a frame memory, and the periodicity of the first synchronization signal is different from the periodicity of the second synchronization signal.

10. The sensor apparatus according to claim 1, wherein the control circuit is further configured to control an access to the each of the plurality of groups of pixels, and the access to the each of the plurality of groups of pixels is successive.

11. The sensor apparatus according to claim 10, wherein the access to the each of the plurality of groups of pixels is in a specific sequence, and the access to the each of the plurality of groups of pixels starts from the access to the specific group of pixels.

12. The sensor apparatus according to claim 1, wherein the control circuit is further configured to control change of a read frequency of each of the plurality of groups of pixels.

13. The sensor apparatus according to claim 1, wherein the each of the plurality of groups of pixels includes a plurality of scan lines, the signal processing circuit is further configured to output specific data in which data regarding the plurality of scan lines is arranged onto a same line.

14. The sensor apparatus according to claim 1, wherein the control circuit is further configured to control an access to the each of the plurality of pixels, the access to the each of the plurality of pixels is across a plurality of frames, and the read circuit is further configured to read, across the plurality of frames, the respective event based on a frame synchronization signal.

15. The sensor apparatus according to claim 14, wherein based on the respective event that is read across the plurality of frames, the read circuit is associated with a time interval that corresponds to a detection time or a reset time, the time interval is between frames of the plurality of frames, the plurality of pixels is inaccessible to the read circuit in the time interval.

16. The sensor apparatus according to claim 1, wherein the control circuit is further configured to:

output a frame synchronization signal at a time of completion of the scanning process of the plurality of pixels; and generate an output frame rate based on the frame synchronization signal.

17. The sensor apparatus according to claim 1, wherein the control circuit is further configured to:

output event information regarding a plurality of frames, wherein the plurality of frames is associated with a base frame rate, and the based frame rate is based on a concatenation of the plurality of frames; and set a frame at an end of the base frame rate as a dummy frame.

18. The sensor apparatus according to claim 1, wherein the two-dimensional pixel array is configured to acquire gradation information, the gradation information is associated with light incident on the plurality of pixels, and the two-dimensional pixel array is further configured to output the acquired gradation information.

19. The sensor apparatus according to claim 17, wherein the control circuit is further configured to:

combine data in the plurality of frames;

output, based on the combined data, a frame rate of a fixed length; and set a variable access rate based on the output frame rate.

20. The sensor apparatus according to claim 19, wherein the fixed length of the output frame rate is based on a trigger periodicity.

* * * * *